(12) United States Patent
Ito

(10) Patent No.: US 8,369,441 B2
(45) Date of Patent: Feb. 5, 2013

(54) RECEIVING APPARATUS AND RECEIVING METHOD

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/092,362

(22) Filed: Apr. 22, 2011

(65) Prior Publication Data

US 2011/0292983 A1 Dec. 1, 2011

(30) Foreign Application Priority Data

May 27, 2010 (JP) ................................. 2010-121790

(51) Int. Cl.
*H04B 7/02* (2006.01)
*H04L 1/02* (2006.01)
(52) U.S. Cl. .................... 375/267; 375/259; 375/260
(58) Field of Classification Search .................. 375/267
See application file for complete search history.

(56) References Cited

U.S. PATENT DOCUMENTS

| | | | | |
|---|---|---|---|---|
| 7,817,740 | B2* | 10/2010 | Su et al. ......................... | 375/262 |
| 7,864,897 | B2 | 1/2011 | Maeda et al. | |
| 2007/0195809 | A1* | 8/2007 | Blanz et al. .................... | 370/426 |
| 2008/0212720 | A1* | 9/2008 | Abou Rjeily .................. | 375/341 |
| 2008/0232455 | A1* | 9/2008 | Abou Rjeily .................. | 375/233 |
| 2009/0135964 | A1* | 5/2009 | Bahng et al. ................... | 375/341 |
| 2010/0054365 | A1* | 3/2010 | Cheng et al. ................... | 375/320 |
| 2011/0211628 | A1* | 9/2011 | Hammarwall et al. ........ | 375/224 |

FOREIGN PATENT DOCUMENTS

| | | |
|---|---|---|
| JP | 2006-270430 A | 10/2006 |
| JP | 2008-228145 A | 9/2008 |
| JP | 2009-016886 A | 1/2009 |

* cited by examiner

*Primary Examiner* — Erin File
(74) *Attorney, Agent, or Firm* — Fujitsu Patent Center

(57) ABSTRACT

A receiving apparatus includes a converting unit that multiplies first and second reception signal points for the respective first and second reception signals by a matrix and outputs resulting converted first and second reception signal points; a number-of-candidates determining unit that determines a number of candidates for at least first transmission-signal candidate points, based on a reception quality for the first and second reception signals; and an estimating unit that selects, based on the converted first and second reception signal points, the first transmission-signal candidate points and second transmission-signal candidate points, the number of first transmission-signal candidate points corresponding to the determined number of candidates, and that estimates, as the first and second transmission signals, the first and second transmission-signal candidate points with which distances between the selected first and second transmission-signal candidate points and the corresponding converted first and second reception signal points are smallest.

16 Claims, 11 Drawing Sheets

FIG. 5

| ORTHOGONALITY r | NUMBER OF CANDIDATES |
|---|---|
| r=0 | 1 |
| 0=r≦0.2 | 9 |
| 0.2<r≦0.4 | 16 |
| 0.4<r≦0.6 | 25 |
| 0.6<r≦0.8 | 36 |
| r>0.8 | 64 |

| ORTHOGONALITY r | NUMBER OF CANDIDATES FOR x1 | NUMBER OF CANDIDATES FOR x0 |
|---|---|---|
| r=0 | 1 | 1 |
| 0=r≦0.2 | 9 | 9 |
| 0.2<r≦0.4 | 16 | 16 |
| 0.4<r≦0.6 | 25 | 25 |
| 0.6<r≦0.8 | 36 | 36 |
| r>0.8 | 64 | 64 |

FIG. 9B

| ORTHOGONALITY r | NUMBER OF CANDIDATES FOR x0 |
|---|---|
| r=0 | 1 |
| 0=r≦0.1 | 9 |
| 0.1<r≦0.2 | 16 |
| 0.2<r≦0.4 | 25 |
| 0.4<r≦0.8 | 36 |
| r>0.8 | 64 |

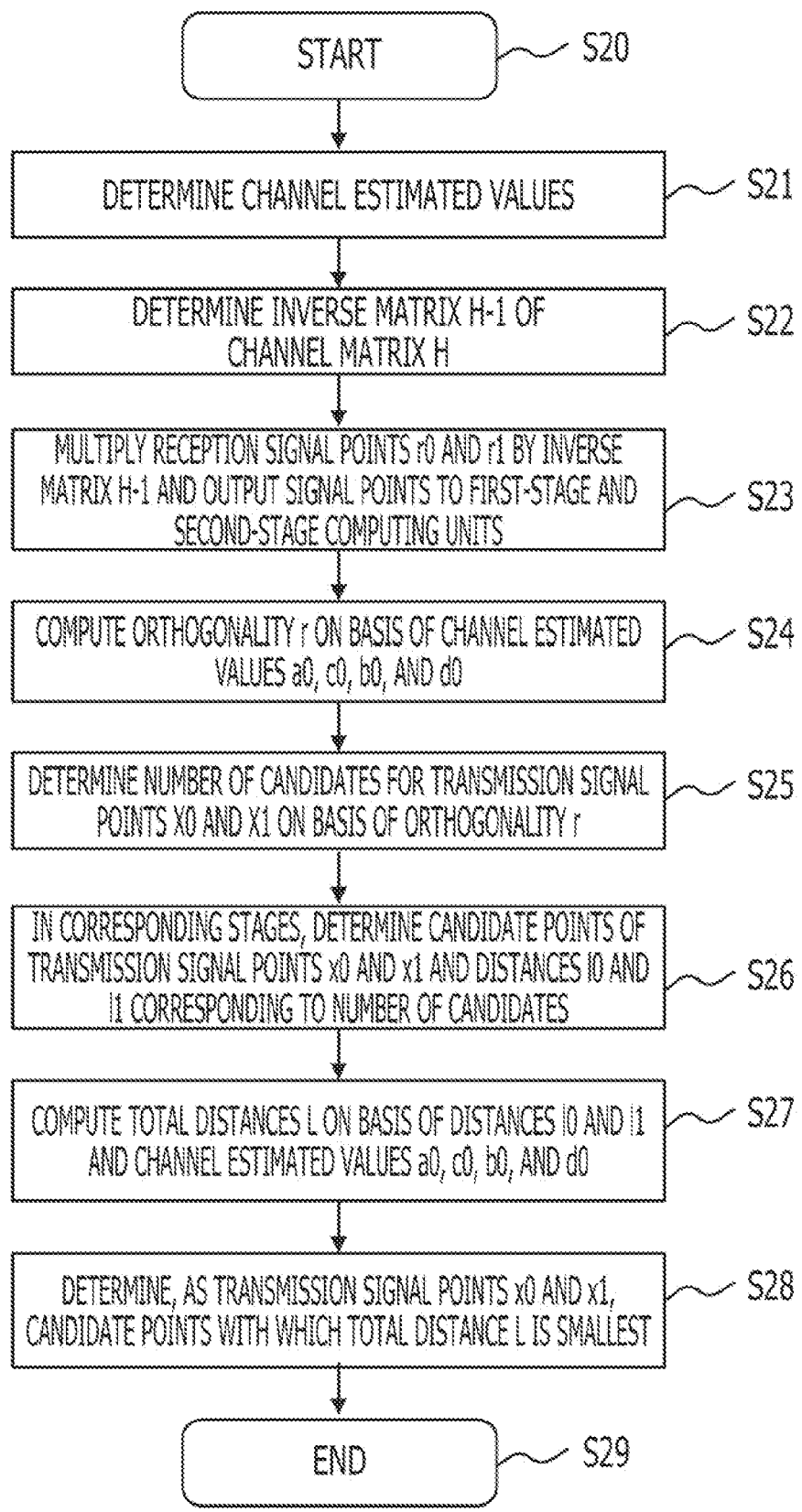

RECEIVING APPARATUS AND RECEIVING METHOD

CROSS-REFERENCE TO RELATED APPLICATIONS

This application is based upon and claims the benefit of priority of the prior Japanese Patent Application No. 2010-121790, filed on May 27, 2010, the entire contents of which are incorporated herein by reference.

FIELD

Embodiments described herein relate to a receiving apparatus and a receiving method.

BACKGROUND

MIMO (Multiple-Input Multiple-Output) is available as a wireless communication technology. In the MIMO technology, different signals are transmitted from multiple transmit antennas in parallel and are spatially multiplexed to achieve high-speed transmission.

In such MIMO wireless communication systems, a receiving end performs various types of detection processing so that it can as accurately as possible demultiplex and detect the signals transmitted from the transmit antennas.

One example of the detection processing is Full-MLD (Maximum Likelihood Detection). Full-MLD is detection processing in which, for example, distances between reception signal points and transmitted candidate points (or signal replica candidate points) are determined and the transmitted candidate points with which the distance is the smallest are estimated as transmission signal points. In Full-MLD, however, since distances with respect to all transmitted candidate points are computed, the amount of computation becomes enormous depending on the number of transmit antennas, a modulation system, and so on. Accordingly, detection processing called QRM-MLD has also been available.

QRM-MLD is a combination of, for example, QR decomposition and MLD to estimate the transmission signal points while reducing the transmitted candidate points. Thus, QRM-MLD involves a small amount of computation compared to Full-MLD. QRM-MLD will now be described.

First, a MIMO wireless communication system is modeled, for example, as follows:

$$y = Hx + n \quad (1)$$

In equation (1), y denotes a reception signal vector, x denotes a transmission signal vector, n denotes a noise vector, and H denotes a channel response matrix (or a channel matrix). When the number of transmit antennas is 2 and the number of receive antennas is 2, equation (1) can be expressed as:

$$\begin{pmatrix} y_0 \\ y_1 \end{pmatrix} = \begin{pmatrix} a & b \\ c & d \end{pmatrix} \begin{pmatrix} x_0 \\ x_1 \end{pmatrix} + \begin{pmatrix} n_0 \\ n_1 \end{pmatrix} \quad (2)$$

In equation (2), $y_0$ and $y_1$ denote reception signal points, $x_0$ and $x_1$ denote transmission signal points (or transmission-signal candidate points), a, b, c, and d denote elements of the channel matrix H, and $n_0$ and $n_1$ denote noise components.

In this case, the channel matrix H can be decomposed into a unitary matrix Q (a matrix whose matrix product with a complex conjugate transpose matrix Q* is equal to a unit matrix) and an upper triangular matrix R and can be expressed by QR decomposition as:

$$H = QR \quad (3)$$

Multiplying both sides of equation (1) from the left by the complex conjugate transpose matrix Q* of the unitary matrix Q yields:

$$Q^* y = Q^*(Hx + n) \quad (4)$$
$$= Q^* H x + Q^* n$$
$$= Rx + n'$$

Therefore, equation (4) can be expressed as:

$$\begin{pmatrix} y_0' \\ y_1' \end{pmatrix} = \begin{pmatrix} a' & b' \\ 0 & c' \end{pmatrix} \begin{pmatrix} x_0 \\ x_1 \end{pmatrix} + \begin{pmatrix} n_0' \\ n_1' \end{pmatrix} \quad (5)$$

In this case, $y_0'$ and $y_1'$ denote signal points obtained by multiplying the reception signal points $y_0$ and $y_1$ by the unitary matrix Q, a', b', and c' denote elements of the upper triangular matrix R, and $n_0'$ and $n_1'$ denote values obtained by multiplying the noise components $n_0$ and $n_1$ by the unitary matrix Q. The elements of equation (5) are given as:

$$y_0' = a' x_0 + b' x_1 + n_0' \quad (5\text{-}1)$$

$$y_1' = c' x_1 + n_1' \quad (5\text{-}2)$$

In QRM-MLD, the candidate points having a smallest amount of noise, i.e., $x_0$ and $x_1$ with which expression (5-3) below is the smallest, are selected from the candidate points $x_0$ and $x_1$:

$$|y_1' - c' x_1|^2 + |y_0' - a' x_0 - b' x_1|^2 \quad (5\text{-}3)$$

That is, in a first stage, multiple candidate points $x_1$ with which $|y_1' - c' x_1|^2$ is smaller than a threshold are selected, and in a second stage, candidate points $x_0$ with which $|y_0' - a' x_0 - b' x_1|^2$ is smaller than a threshold are selected from the multiple candidate points $x_1$ selected in the first stage. Lastly, the candidate points $x_0$ and $x_1$ with which expression (5-3) is the smallest are selected from those selected candidate points $x_0$ and $x_1$ and are determined (estimated) to be the transmission signal points $x_0$ and $x_1$.

For example, there has been a MIMO multiplexing communication apparatus in which, in a stage M+1, branch metrics (Euclidean distances) with respect to symbol replica candidates are compared with a threshold, and when the branch metric is larger than the threshold, subsequent search is not performed.

One example is a receiver that is adapted to derive a relative signal-to-noise ratio for each set of a modulation system and a code rate by using a determination table, to rearrange the elements of the channel matrix in descending order of the signal-to-noise ratio, and to sequentially estimate the transmission signals in ascending order of the error rates of the reception signals.

Another example is a signal detecting apparatus that is adapted to narrow down candidates of the transmission sequence, excluding upper-limit-exceeding cumulative metrics of cumulative metrics determined in cumulative-metrics generation processing and partial layer sequence candidates corresponding to the upper-limit exceeding cumulative metrics from the candidates.

SUMMARY

According to an aspect of the embodiment, a receiving apparatus includes a converting unit that multiplies first and second reception signal points for the respective first and second reception signals by a predetermined matrix and outputs resulting converted first and second reception signal points, a number-of-candidates determining unit that determines the number of candidates for at least first transmission-signal candidate points, based on a reception quality for the first and second reception signals, and an estimating unit that selects, based on the converted first and second reception signal points, the first transmission-signal candidate points and second transmission-signal candidate points, the number of first transmission-signal candidate points corresponding to the determined number of candidates, and that estimates, as the first and second transmission signals, the first and second transmission-signal candidate points with which distances between the selected first and second transmission-signal candidate points and the corresponding converted first and second reception signal points are smallest.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 illustrates an example of a number-of-candidates determination table;

FIGS. 9A and 9B illustrate examples of the number-of-candidates determination table;

FIG. 10 is a flowchart illustrating an exemplary operation; and

DESCRIPTION OF EMBODIMENTS

Figure 1:
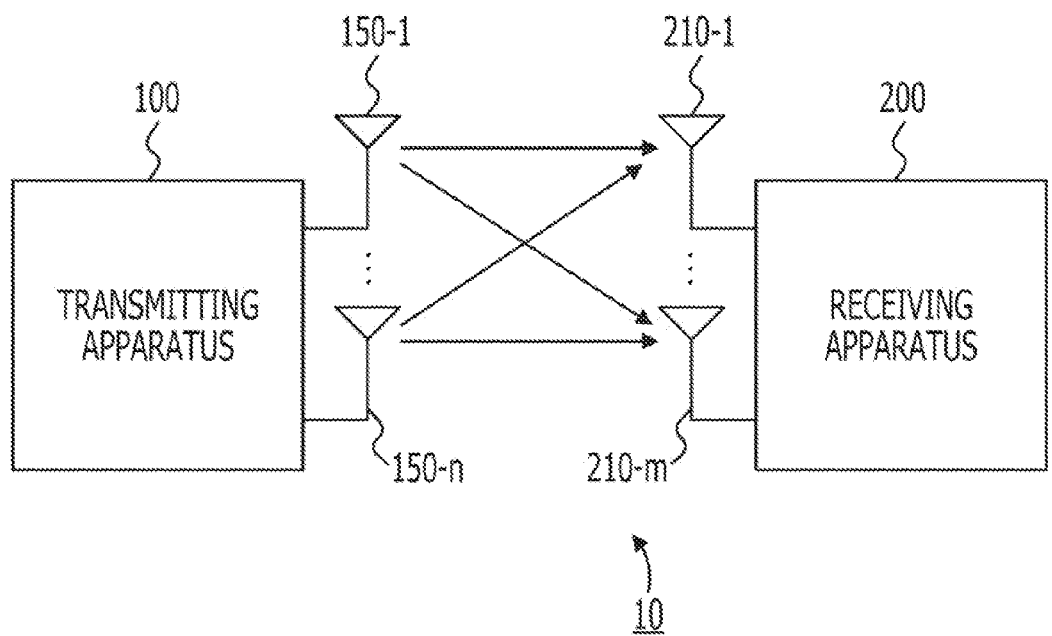
FIG. 1 is an exemplary configuration of a wireless communication system.

In a QRM-MLD-based detection processing in which multiple candidate points $x_1$ are selected in a first stage, the amount of processing executed in a second stage varies significantly depending on the number of candidate points $x_1$ to be selected.

In the above-described technology, for example, when the branch metrics are compared with the threshold or when the upper-limit exceeding cumulative metrics are excluded from the candidates, the number of candidate points $x_1$ to be selected is constant since the values of the threshold and an upper limit are predetermined. In such a case, there may be cases in which the candidate points $x_1$ are not sufficiently narrowed down, and thus the amount of processing executed in the first and second stages may exceed a threshold.

In addition, in the above-described technology, even when the arrangement is such that the channel matrix is rearranged for each set of a modulation system and a code rate so that the transmission signals are sequentially estimated in ascending order of the error rate of the reception signals, processing with respect to the number of candidates for the candidate points $x_1$ of the transmission signals is not performed. In the technology, since the number of candidates to be selected is predetermined, the amount of processing executed in the first and second embodiments may exceed the threshold.

Accordingly, one object of the present invention is to provide a receiving apparatus and a receiving method which reduce the amount of processing.

According to one embodiment, there is provided a receiving apparatus for estimating first and second transmission signals transmitted from respective first and second transmit antennas of a transmitting apparatus, based on first and second reception signals received by respective first and second receive antennas. The receiving apparatus includes a converting unit that multiplies first and second reception signal points for the respective first and second reception signals by a matrix and outputs resulting converted first and second reception signal points; a number-of-candidates determining unit that determines a number of candidates for at least first transmission-signal candidate points, based on a reception quality for the first and second reception signals; and an estimating unit that selects, based on the converted first and second reception signal points, the first transmission-signal candidate points and second transmission-signal candidate points, the number of first transmission-signal candidate points corresponding to the determined number of candidates, and that estimates, as the first and second transmission signals, the first and second transmission-signal candidate points with which distances between the selected first and second transmission-signal candidate points and the corresponding converted first and second reception signal points are smallest.

Thus, it is possible to provide a reception apparatus and a reception method which reduce the amount of processing.

FIG. 1 illustrates an exemplary configuration of a wireless communication system 10. The wireless communication system 10 has a transmitting apparatus 100 and a receiving apparatus 200.

For example, the transmitting apparatus 100 may be a radio base-station apparatus and the receiving apparatus 200 may be a terminal apparatus. Alternatively, the transmitting apparatus 100 may be a terminal apparatus and the receiving apparatus 200 may be a radio base-station apparatus. The transmitting apparatus 100 has n transmit antennas 150-1 to 150-$n$ (where n is a natural number that satisfies n≧2 and the receiving apparatus 200 has m receive antennas 210-1 to 210-$m$ (where m is a natural number that satisfies m 2). The transmitting apparatus 100 and the receiving apparatus 200 can perform wireless communication based on a MIMO system by using the transmit antennas 150-1 to 150-$n$ and the receive antennas 210-1 to 210-$m$.

Figure 2A:
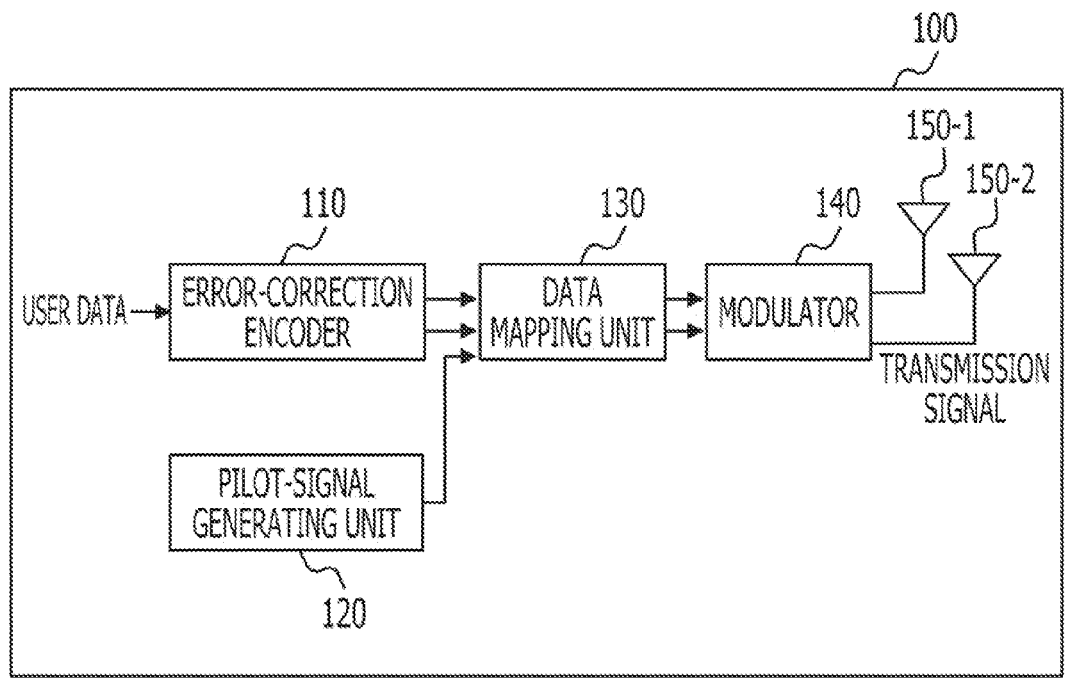
FIG. 2A and FIG. 2B illustrate exemplary configurations of a transmitting apparatus and a receiving apparatus, respectively.
Figure 2B:
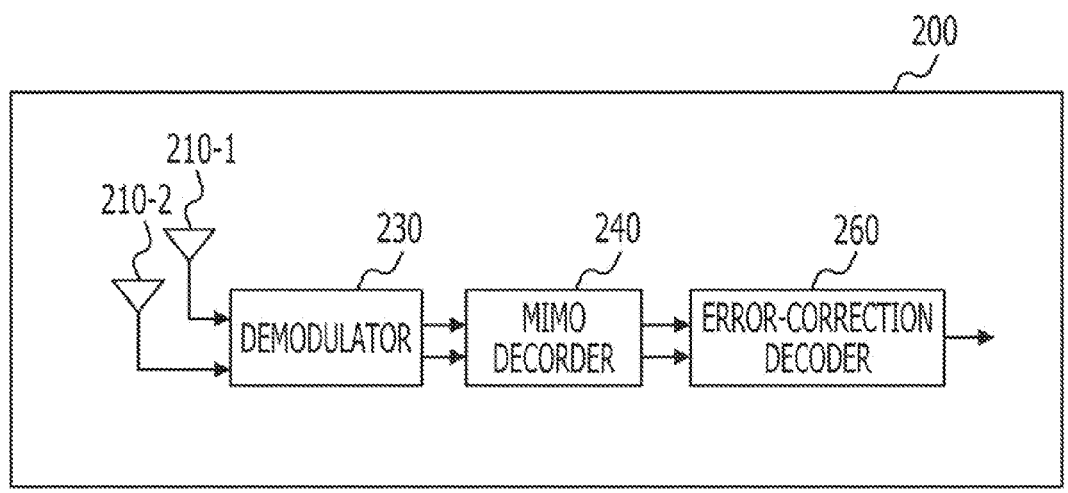

Exemplary configurations of the transmitting apparatus 100 and the receiving apparatus 200 will be described next. FIG. 2A and FIG. 2B are diagrams illustrating exemplary configurations of the transmitting apparatus 100 and the receiving apparatus 200, respectively. FIGS. 2A and 2B illustrate an example of the MIMO wireless communication system 10 in which the number of transmit antennas 150 is 2 (i.e., n=2) and the number of receive antennas 210 is 2 (i.e., m=2).

The transmitting apparatus 100 includes an error-correction encoder 110, a pilot-signal generating unit 120, a data mapping unit 130, a modulator 140, a first transmit antenna 150-1, and a second transmit antenna 150-2.

The error-correction encoder 110 performs error-correction encoding processing on user data in accordance with a code rate, which may be predetermined. The error-correction encoder 110 outputs, for each of the first and second transmit antennas 150-1 and 150-2, encoded user data (hereinafter, encoded data) to the data mapping unit 130.

The pilot-signal generating unit 120 generates a pilot signal (or a known signal) and outputs the pilot signal to the data mapping unit 130.

The data mapping unit 130 maps bit sequences of the encoded data and the pilot signal onto transmission symbols (e.g., OFDM (orthogonal frequency division multiplexing) symbols).

The modulator 140 performs modulation, which is based on a modulation system, on the transmission symbols output from the data mapping unit 130. Examples of the modulation system include QPSK (Quadrature Phase Shift Keying), 16-QAM (Quadrature Amplitude Modulation), and 64-QAM. When the wireless communication system 10 is an OFDM system, the modulator 140 performs IFFT (Inverse Fast Fourier Transform), and when the wireless communication system 10 is a CDMA (code division multiple access) system, the modulator 140 performs processing such as spreading. A description below will be given of a case in which the wireless communication system 10 is an OFDM system. The modulator 140 outputs IFFT-processed transmission symbols to the first and second transmit antennas 150-1 and 150-2 as transmission signals.

The first and second transmit antennas 150-1 and 150-2 respectively transmit different transmission signals to the receiving apparatus 200 as radio signals by using, for example, the same radio resources.

In a description of the operation in the present embodiment, the radio signals transmitted from the first transmit antenna 150-1 and the radio signals transmitted from the second transmit antenna 150-2 are referred to as a "first stream" and a "second stream", respectively, as needed. In a system using precoding, although there is not a one-to-one relationship between the transmit antennas 150-1 and 150-2 and the streams, processing for separating the streams can be accomplished by an operation that is similar to the operation for a case of a one-to-one relationship.

The receiving apparatus 200 includes a first receive antenna 210-1, a second receive antenna 210-2, a demodulator 230, a MIMO decoder 240, and an error-correction decoder 260.

The first and second receive antennas 210-1 and 210-2 receive the radio signals transmitted from the transmitting apparatus 100 and output the received radio signals to the demodulator 230 as reception signals. For example, the first receive antenna 210-1 receives the first stream transmitted from the first transmit antenna 150-1 and the second stream transmitted from the second transmit antenna 150-2. The second receive antenna 210-2 also receives the first stream and the second stream.

The demodulator 230 performs demodulation processing, which is based on a modulation system (e.g., QPSK or 16-QAM), on the two reception signals received by the first and second receive antennas 210-1 and 210-2. The demodulator 230 performs FFT in the case of the OFDM system and performs despreading in the CDMA system. A description below is given in conjunction with an example of the OFDM system, as in the case of the transmitting apparatus 100. The demodulator 230 demodulates the reception signals received by the first and second receive antennas 210-1 and 210-2 and outputs the demodulated reception signals to the MIMO decoder 240.

The MIMO decoder 240 executes first and second stages involving QRM-MLD on the demodulated reception signals, estimates transmission signal points $x_0$ and $x_1$ transmitted from the first and second antennas 150-1 and 150-2 of the transmitting apparatus 100, and outputs the estimated transmission signal points as transmission signals. Details of the MIMO decoder 240 are described below.

The error-correction decoder 260 performs error-correction decoding processing on the transmission signals output from the MIMO decoder 240 and outputs, for example, user data. The demodulator 230, the MIMO decoder 240, and the error-correction decoder 260 may be digital circuits and may be implemented by, for example, an FPGA (Field Programmable Gate Array), an ASIC (Application Specific Integrated Circuit), or a DSP (Digital Signal Processor). For example, the demodulator 230, the MIMO decoder 240, and the error-correction decoder 260 correspond to a converting unit, a number-of-candidates determining unit, and an estimating unit recited in the appended claims.

Details of the MIMO decoder 240 will be described next. There are two exemplary cases, i.e., a case in which the MIMO decoder 240 performs sequential processing in a first stage and a second stage and a case in which the MIMO decoder 240 performs the first stage and the second stage in parallel. These two cases will be independently described as a first embodiment and a second embodiment.

First Embodiment

Figure 3:
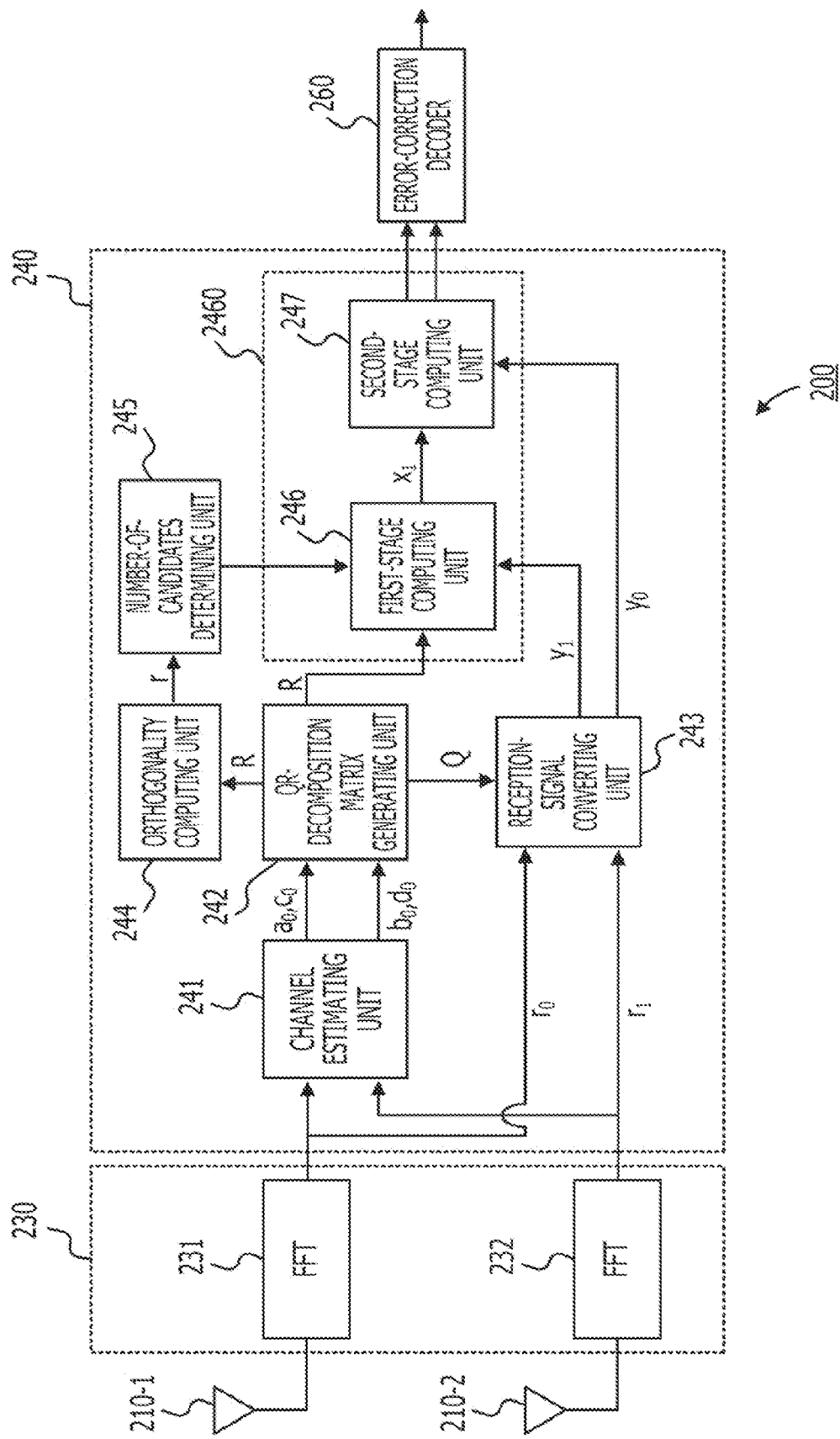
FIG. 3 is a diagram illustrating an exemplary configuration of the receiving apparatus.

FIG. 3 is a diagram illustrating an exemplary configuration of the receiving apparatus 200, the configuration including an exemplary configuration of the MIMO decoder 240 in the first embodiment.

The demodulator 230 has a first FFT unit 231 and a second FFT unit 232. The first and second FFT units 231 and 232 perform FFT processing on the reception signals output from the first and second receive antennas 210-1 and 210-2, respectively. The first and second FFT units 231 and 232 output FFT-processed data symbols $r_0$ and $r_1$ (hereinafter, reception signal points $r_0$ and $r_1$) to a reception-signal converting unit 243. The first and second FFT units 231 and 232 also output, for example, FFT-processed pilot signals to a channel estimating unit (or a reception-quality estimating unit) 241.

The MIMO decoder 240 includes the channel estimating unit 241, a QR-decomposition matrix generating unit 242, a reception-signal converting unit 243, an orthogonality computing unit 244, a number-of-candidates determining unit 245, a first-stage computing unit 246, and a second-stage computing unit 247. Further, the MIMO decoder 240 may be implemented by a processor, the processor of, e.g., an FPGA (Field Programmable Gate Array), an ASIC (Application Specific Integrated Circuit) or a DSP (Digital Signal Processor).

The channel estimating unit 241 performs, for example, averaging processing on the FFT-processed pilot signals and outputs resulting channel estimated values. For example, the channel estimating unit 241 outputs channel estimated values $a_0$ and $c_0$ with respect to the pilot signal received by the first receive antenna 210-1 and outputs channel estimated values $b_0$ and $d_0$ with respect to the pilot signal received by the second receive antenna 210-2. The reason why two channel estimated values $a_0$ and $c_0$ with respect to the pilot signal received by the first receive antenna 210-1 are output is that the reception signals received by the first receive antenna 210-1 contain two streams. The same also applies to the channel estimated values $b_0$ and $d_0$.

On the basis of the channel estimated values $a_0$, $c_0$, $b_0$, and $d_0$ output from the channel estimating unit 241, the QR-decomposition matrix generating unit 242 generates a unitary matrix (or an orthogonal matrix) Q and an upper triangular matrix R in QR decomposition. The QR-decomposition matrix generating unit 242 outputs the unitary matrix Q to the reception-signal converting unit 243 and outputs the upper triangular matrix R to the orthogonality computing unit 244 and the first-stage computing unit 246. The QR-decomposition matrix generating unit 242 generates the two matrices Q and R, for example, in the following manner.

The QR-decomposition matrix generating unit 242 generates a channel matrix H on the basis of the channel estimated values $a_0$, $c_0$, $b_0$, and $d_0$. The channel matrix H is given by:

$$H = \begin{pmatrix} a_0 & b_0 \\ c_0 & d_0 \end{pmatrix} \quad (6)$$

With respect to the channel matrix H, the unitary matrix Q is computed as:

$$Q = \frac{1}{\sqrt{|a_0|^2 + |c_0|^2}} \begin{pmatrix} a_0^* & c_0^* \\ -c_0 & a_0 \end{pmatrix} \quad (7)$$

In this case, the upper triangular matrix R is given as:

$$R = \begin{pmatrix} a & b \\ 0 & c \end{pmatrix} \quad (8)$$

When the inverse matrix $Q^{-1}$ of the unitary matrix Q is multiplexed from the left of equation (3), the elements a, b, and c of the upper triangular matrix R are given as:

$$a = \frac{|a_0|^2 + |c_0|^2}{\sqrt{|a_0|^2 + |c_0|^2}} \quad (9)$$

$$b = \frac{a_0^* b_0 + c_0^* d_0}{\sqrt{|a_0|^2 + |c_0|^2}} \quad (10)$$

$$c = \frac{a_0 d_0 - b_0 c_0}{\sqrt{|a_0|^2 + |c_0|^2}} \quad (11)$$

The QR-decomposition matrix generating unit 242 can determine the upper triangular matrix R, for example, by substituting values into equations (9) to (11) with respect to the channel estimated values $a_0$, $c_0$, $b_0$, and $d_0$ and can further determine elements of the unitary matrix Q by substituting the channel estimated values $a_0$, $c_0$, $b_0$, and $d_0$ into equation (8).

The reception-signal converting unit 243 multiplies the reception signal points $r_0$ and $r_1$ for the modulated reception signals, received by the first and second receive antennas 210-1 and 210-2, by the unitary matrix Q, to thereby convert the reception signals into signal points $y_0$ and $y_1$, and outputs the signal points $y_0$ and $y_1$. As described above, the MIMO wireless communication system 10 can be modeled as expressed by equation (1), and equation (1) is multiplexed from the left by the conjugate transpose matrix Q* of the unitary matrix Q to yield equation (4). Letting the left term of equation (4) be $(y_0, y_1)$, equation (4) is expressed as:

$$\begin{pmatrix} y_0 \\ y_1 \end{pmatrix} = \begin{pmatrix} a & b \\ 0 & c \end{pmatrix} \begin{pmatrix} x_0 \\ x_1 \end{pmatrix} + \begin{pmatrix} n_0' \\ n_1' \end{pmatrix} \quad (12)$$

After the reception-signal converting unit 243 converts a reception signal vector $(r_0, r_1)$ into $(y_0, y_1)$, a distance (or norm) $|y_1 - cx_1|^2$ that includes the transmission signal point $x_1$ and does not include the transmission signal point $x_0$ can be calculated in the first stage involving QRM-MLD. The reception-signal converting unit 243 outputs the converted signals $y_0$ and $y_1$ to the second-stage and first-stage computing units 247 and 246, respectively.

The orthogonality computing unit 244 calculates an orthogonality r by using the ratio of the diagonal element c versus the off-diagonal element b in the upper triangular matrix R. That is, the orthogonality computing unit 244 computes:

$$r = |b/c| \quad (13)$$

The orthogonality computing unit 244 outputs the computed orthogonality r to the number-of-candidates determining unit 245.

On the basis of the orthogonality r, the number-of-candidates determining unit 245 determines the number of candidates for the transmission signal point $x_1$ which are to be computed by the first-stage computing unit 246. The number-of-candidates determining unit 245 outputs the determined number of candidates to the first-stage computing unit 246. For example, when the orthogonality r (=|b/c|) is larger than a first threshold, the number-of-candidates determining unit 245 sets the number of candidates for the transmission signal point $x_1$ such that the number of candidates is larger than a second threshold. When the orthogonality r is smaller than or equal to the first threshold, the number-of-candidates determining unit 245 determines the number of candidates such that it is smaller than or equal to the second threshold.

A reason why the number of candidates for the transmission signal point $x_1$ may be determined based on the orthogonality r (=|b/c|) will be described below. In the QRM-MLD, in the first stage, calculation is performed as given by:

$$|y_1 - cx_1|^2 \quad (14)$$

In the second stage, calculation is performed as given by:

$$|y_0 - ax_0 - bx_1|^2 \quad (15)$$

In addition, a combination of the transmission signal points $x_0$ and $x_1$ with which the sum of expressions (14) and (15) is the smallest is determined. That is, in the second stage, the candidate points are selected from the candidate points for the transmission signal point $x_1$ which were selected in the first stage.

However, according to an example embodiment the number of candidates for the transmission signal point $x_1$ selected in the first stage is narrowed down to within a range in which no inversion occurs. The term "inversion" refers to a case in which the candidate points of the transmission signal point $x_1$ selected in the second stage are candidate points other than the candidate points selected in the first stage. In the present embodiment, in order to ensure that such inversion does not occur, the number-of-candidates determining unit 245 determines the number of candidates for the transmission signal point $x_1$.

When attention is given to expression (14), the magnitude of expression (14) varies according to the magnitude of $x_1$ and the degree of the variation depends on the magnitude of the coefficient c of $x_1$. For example, when the coefficient c is 100, the magnitude of expression (14) has a value, such as $100^2$ or $300^2$, that varies greatly depending on the value of $x_1$. In such a case, when $x_1$ with which the magnitude of expression (14) is the smallest is selected as a candidate point, it is highly likely that the selected candidate point is also the most favorable candidate point in the second stage, since differences relative to the magnitude of expression (14) with respect to other candidates are large. Thus, when the value of c is larger than a threshold, the probability that the above-described inversion occurs is smaller than a threshold even when the number of candidates for $x_1$ is narrowed down.

On the other hand, when c has a value close to 0, the magnitude of expression (14) changes to, for example, $1^2$, $3^2$, and so on, which is smaller than a case in which c is 100, no matter how $x_1$ is selected. In such a case, when the number of candidate points for $x_1$ is excessively narrowed down in the first stage, the inversion can occur since differences relative to the candidate points in expression (14) are small compared to the case in which c is 100. Thus, in such a case, in the first stage, a larger number of candidates than in the case in which c is 100 may be selected.

In the second stage, when attention is given to equation (15), $x_1$ is dependent on the magnitude of the coefficient b. For example, when b is larger a threshold, the magnitude of equation (15) can assume a value that varies greatly according to the magnitude of $x_1$. Thus, in such a case, equation (15) has a value that varies greatly depending on $x_1$ selected in the first stage. In such a case, a larger number of candidates for $x_1$ than the threshold may be selected in the first stage, taking the above-described inversion into account.

On the other hand, when b is smaller than the threshold, the magnitude of equation (15) varies in a small range of values compared to the case in which b is larger than the threshold, regardless of the selection of $x_1$. In such a case, since a change in the magnitude of equation (15) is small, the number of candidates for $x_1$ selected in the first stage may be set smaller than the threshold. For example, when b is 0, $x_1$ selected in expression (14) is the most favorable $x_1$ (in this case, the number of candidates is 1), the magnitude of (15) becomes independent from $x_1$, and candidate points of another transmission signal point $x_0$ are selected in the second stage.

Thus, the number of candidates for $x_1$ selected in the first and second stages is dependent on the coefficients b and c in the first and second stages. Hence, in the present embodiment, the number of candidates is determined according to the value of $|b/c|$.

However, the influence the selection of $x_1$ in the first stage has on the second stage depends on the magnitude of the coefficient b in equation (15). That is, since the ultimate value of $x_1$ is selected in the second stage, the coefficient b has a larger degree of influence on distance calculation in each stage than the coefficient c. Thus, the inversion is more likely to occur depending on the magnitude of b.

From equations (10) and (11), b/c is expressed as:

$$\frac{c}{b} = \frac{a_0^* b_0 + c_0^* d_0}{a_0 d_0 - b_0 c_0} \qquad (16)$$

In this case, when a reception vector A of the first stream is represented by $(a_0, c_0)$ and a reception vector B of the second stream is represented by $(b_0, d_0)$, the denominator of equation (16) is equal to the outer product of the two vectors A and B and the numerator is equal to the inner product of the two vectors A and B. Letting θ be an angle between the two vectors A and B, equation (16) is given as a θ-dependent equation, as expressed by:

$$\frac{a_0^* b_0 + c_0^* d_0}{a_0 d_0 - b_0 c_0} = \frac{|A||B|\cos\theta}{|A||B|\sin\theta} = \frac{1}{\tan\theta} \qquad (17)$$

Figure 4A:
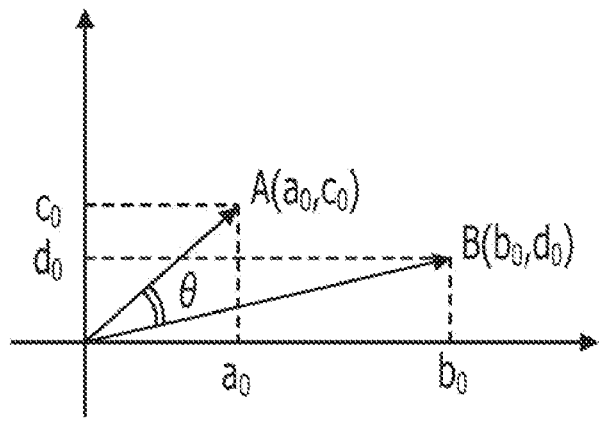
FIGS. 4A, 4B, and 4C depict examples of relationships between reception vectors and an angle.
Figure 4B:
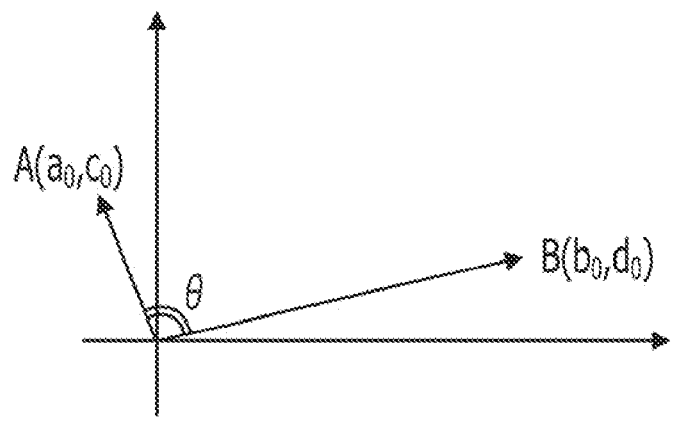
Figure 4C:
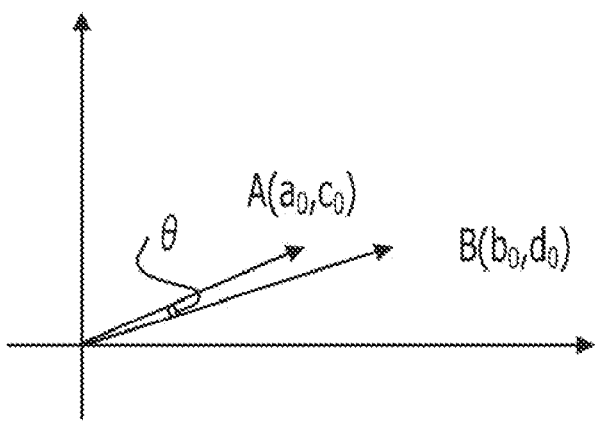

Herein, for example, an amount corresponding to θ is used as an orthogonality r. FIGS. 4A to 4C depict examples of relationships between two vectors A and B and the angle θ. When θ is 90° (or the vectors A and B are orthogonal to each other, for example, as depicted in FIG. 4B), the orthogonality r is 0, and when 0 is 0° (or the vectors A and B are parallel to each other or the degree of orthogonality is the smallest, for example, as depicted in FIG. 4C), the orthogonality r is infinite.

For example, since it is known that two vectors are orthogonal to each other when the inner product of complex vectors is 0, the orthogonality r is 0 when two vectors A and B are orthogonal to each other. With respect to complex components, r can also be regarded as an amount associated with the degree of the orthogonality of two vectors A and B.

Thus, when b/c is sufficiently small, the degree of influence of the candidate points of the transmission signal point $x_1$ which are selected in the first stage and the degree of influence of the candidate points of the transmission signal point $x_0$ which are selected in the second stage are smaller than a threshold, and the candidate points of two transmission signal points $x_0$ and $x_1$ can be selected independently in the respective stages. In such a case, it can be said that two transmission signal points $x_0$ and $x_1$ can be easily separated.

Thus, with the orthogonality r (=b/c) being smaller than the threshold, even when the number-of-candidates determining unit 245 sets the number of candidates such that it is smaller than the threshold, $x_0$ with which the distance $|y_0-ax_0-bx_1|^2$ is smaller than or equal to a threshold is selected in the second stage, as long as an $x_1$ candidate point with which the distance $|y_1-cx_1|^2$ is sufficiently small is selected. Consequently, for example, the amount of processing in the first stage and the second stage is reduced by an amount corresponding to a reduction in the number of candidates relative to the threshold.

On the other hand, when b/c is larger than the threshold, $bx_1$ also becomes sufficiently large and the degree of influence the candidate points of the transmission signal point $x_1$ which were selected in the first stage have on expression (15) in the second stage increases correspondingly. That is, depending on which candidate point of the transmission signal point $x_1$ is selected in the first stage, the value of expression (15) varies greatly. In such a case, when the candidate points of the transmission signal point $x_1$ are excessively narrowed down, candidate points of the correct transmission signal point $x_0$ cannot be selected in the second stage (because of occurrence of the inversion). When the correct transmission signal points $x_1$ and $x_0$ are not estimated as a result of the excessive narrowing down of the candidate points, the radio characteristics deteriorate. Thus, when the orthogonality r (=b/c) is larger than the threshold, the number-of-candidates determining unit 245 can prevent such radio characteristic deterioration by determining the number of candidate points which is larger than the threshold.

As described above, b/c indicating the orthogonality r represents, for example, ease of separation of two transmission streams. When two transmission streams can be easily decomposed (i.e., when the orthogonality r is larger than the threshold), it is regarded that the MIMO wireless communication system 10 has a favorable reception quality. When it is difficult to separate two transmission streams (i.e., when the orthogonality is smaller than or equal to the threshed), the reception quality is not favorable.

The number-of-candidates determining unit 245 determines the number candidates such that, for example, when the reception quality is more favorable than the threshold, the number of candidates for the candidate points of the transmission signal point $x_1$ is smaller than the threshold and, when the reception quality is less favorable than the threshold, the number of candidates is larger than the threshold. The reception quality is, for example, an index indicating ease of separation of a plurality of transmission streams into discrete streams.

FIG. 5 illustrates an example of a number-of-candidates determination table 2451 held by the number-of-candidates determining unit 245. In the example illustrated in FIG. 5, the modulation system is 64QAM. The number-of-candidates determination table 2451 has an "orthogonality" field and a "number of candidates" field, in which the number of candidates is stored for each orthogonality. The number-of-candidates determining unit 245 refers to the number-of-candidates determination table 2451 to read the number of candidates which corresponds to the orthogonality r output from the orthogonality computing unit 244, and outputs the read number of candidates to the first-stage computing unit 246. As illustrated in the number-of-candidates determination table 2451, when the orthogonality is 0, two transmission streams can be easily separated (i.e., the reception quality is favorable) and the number of candidates is 1, which is the smallest number. When the orthogonality is larger than 0.8, it is difficult to separate two transmission streams (i.e., the reception quality is not favorable) and the number of candidates is 64, which is the largest number.

Referring back to the example of FIG. 3, by using the upper triangular matrix R, the converted signal points $y_1$, and the number of candidates, the first-stage computing unit 246 selects candidate points for $x_1$, the number of candidate points corresponding to the number of candidates. That is, the first-stage computing unit 246 selects, in ascending order of the value of expression (14), the candidate points for the transmission signal point $x_1$ which correspond to the number of candidates determined by the number-of-candidates determining unit 245. The first-stage computing unit 246 outputs, to the second-stage computing unit 247, the candidate points of the transmission signal point $x_1$ which correspond to the number of candidates.

By using the candidate points for the transmission signal point $x_1$ and the converted signal point $y_0$, the second-stage computing unit 247 selects one or multiple candidate points for the transmission signal point $x_0$ such that the value of expression (15) is smaller than a threshold. The second-stage computing unit 247 then estimates, as the transmission signal points $x_0$ and $x_1$, the candidate points with which the sum of expression (14) and expression (15) is the smallest, and outputs the estimated transmission signal points $x_0$ and $x_1$. An estimating unit 2460 estimates the signal points $x_0$ and $x_1$ of the two transmission signals, and may have the first-stage and second-stage computing units 246 and 247.

The error-correction decoder 260 performs error-correction decoding processing on the transmission signal points $x_0$ and $x_1$.

Figure 6:
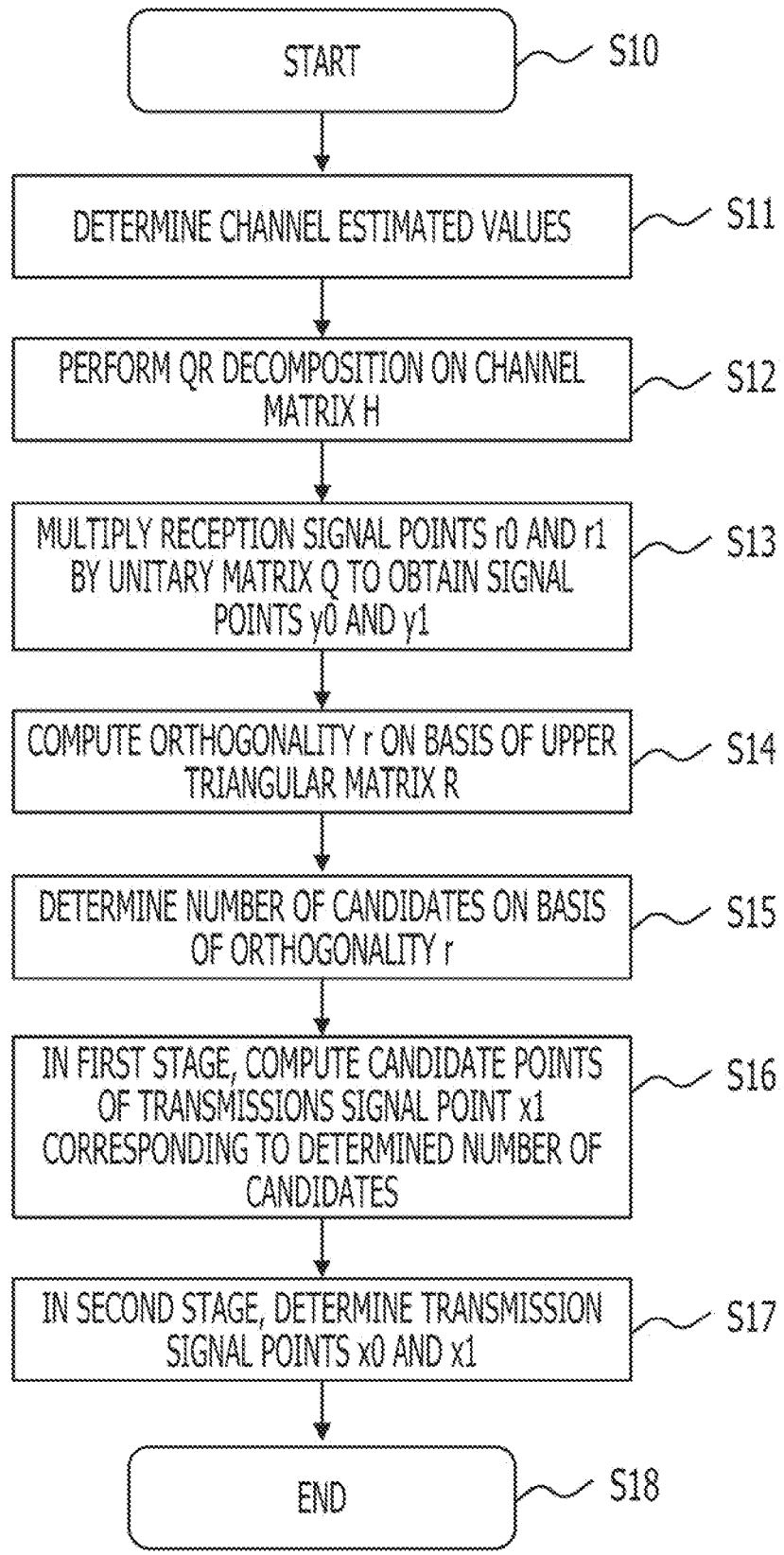
FIG. 6 is a flowchart illustrating an exemplary operation.

An exemplary operation in the first embodiment will be described next. FIG. 6 is a flowchart illustrating an exemplary operation. The receiving apparatus 200 starts processing in operation S10 and determines channel estimated values in operation S11. For example, the channel estimating unit 241 determines channel estimated values $a_0$, $c_0$, $b_0$, and $d_0$ on the basis of demodulated pilot signals.

In operation S12, the receiving apparatus 200 performs QR decomposition on a channel matrix H. For example, on the basis of the channel estimated values $a_0$, $c_0$, $b_0$, and $d_0$, the QR-decomposition matrix generating unit 242 generates an upper triangular matrix R (e.g., equation (8)) and a unitary matrix Q (e.g., equation (7) and equations (9) to (11)) with respect to the channel matrix H.

In operation S13, the receiving apparatus 200 multiplies reception signal points $r_0$ and $r_1$ by the unitary matrix Q to obtain signal points $y_0$ and $y_1$. For example, the reception-signal converting unit 243 multiplies the reception signal points $r_0$ and $r_1$ by the unitary matrix Q output from the QR-decomposition matrix generating unit 242, to obtain the signal points $y_0$ and $y_1$ (e.g., equation (12)).

In operation S14, the receiving apparatus 200 computes an orthogonality r on the basis of the upper triangular matrix R. For example, the orthogonality computing unit 244 computes the orthogonality r (e.g., equation (13)) by computing the ratio (e.g., "b/c") of the diagonal element versus the off-diagonal element with respect to the matrix R output from the QR-decomposition matrix generating unit 242.

In operation S15, the receiving apparatus 200 determines the number of candidates on the basis of the orthogonality r. For example, by referring to the number-of-candidates determination table 2451, the number-of-candidates determining unit 245 selects the number of candidates which corresponds to the orthogonality r.

After the processing in operation S12, the receiving apparatus 200 may perform the processing in operations S14 and S15 prior to the processing in operation S13.

In operation S16, in a first stage, the receiving apparatus 200 computes candidate points of the transmission signal point $x_1$ which correspond to the determined number of candidates. For example, the first-stage computing unit 246 computes, in ascending order of the distance $|y_1 - cx_1|^2$, candidate points of the transmission signal point $x_1$ which correspond to the number of candidates.

In a second stage, in operation S17, the receiving apparatus 200 determines the transmission signal points $x_0$ and $x_1$. For example, the second-stage computing unit 247 computes, in ascending order of the distance $|y_0 - ax_0 - bx_1|^2$, one or multiple candidate points of the transmission signal point $x_1$ and determines, as the transmission signal points $x_0$ and $x_1$, the candidate points with which $|y_1 - cx_1|^2 + |y_0 - ax_0 - bx_1|^2$ is the smallest.

In operation S18, the receiving apparatus 200 ends the series of processing.

The description in the first embodiment has been given of an example in which the orthogonality r is the ratio (b/c) of the diagonal element in the upper triangular matrix R. For example, for the ratio of the diagonal element, the orthogonality r may be c/b. In such a case, when the orthogonality r is larger than a threshold (i.e., when the reception quality is not favorable), the number-of-candidates determining unit 245 selects the number of candidates which is larger than a threshold, and when the orthogonality r is smaller than or equal to the threshold (i.e., when the reception quality is favorable), the number-of-candidates determining unit 245 selects the number of candidates which is smaller than or equal to the threshold.

Second Embodiment

A second embodiment will be described next. The second embodiment is an example in which the first and second stages are executed in parallel and is similar to the first embodiment in that the number of candidates to be selected is varied based on the orthogonality (or the reception quality).

Figure 7:
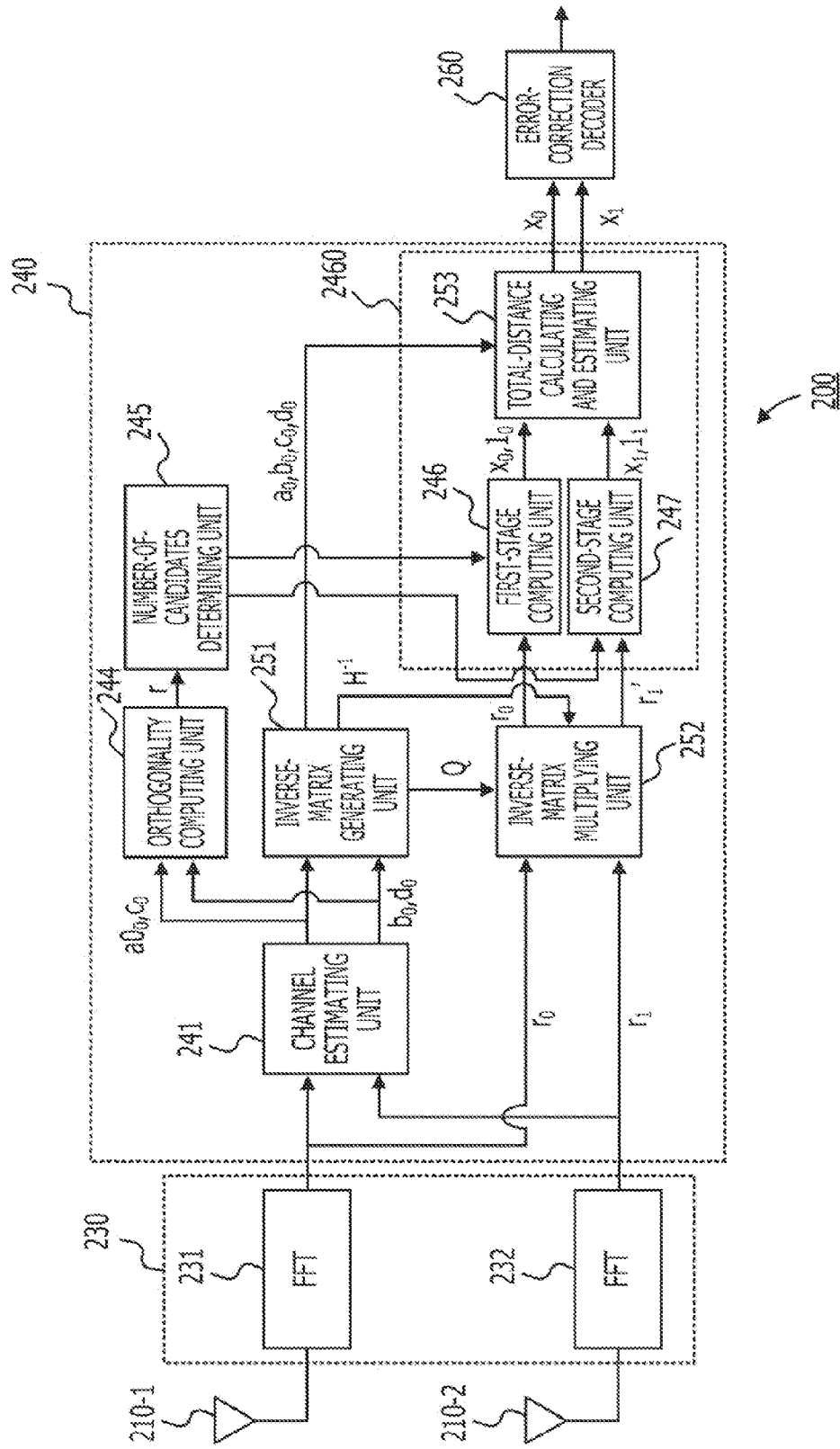
FIG. 7 is a diagram illustrating another exemplary configuration of the receiving apparatus.

FIG. 7 is a diagram illustrating an exemplary configuration of the receiving apparatus 200 including the MIMO decoder 240. The MIMO decoder 240 includes an inverse-matrix generating unit 251, an inverse-matrix multiplying unit 252, and a total-distance calculating and estimating unit (hereinafter, a total-distance calculating unit) 253.

The inverse-matrix generating unit 251 generates an inverse matrix $H^{-1}$ of the channel matrix H on the basis of the channel estimated values $a_0$, $c_0$, $b_0$, and $d_0$.

The inverse-matrix multiplying unit 252 multiplies the reception signal points $r_0$ and $r_1$ by the inverse matrix $H^{-1}$ output from the inverse-matrix generating unit 251, and outputs the resulting signal points $r_0'$ and $r_1'$ to the first-stage and second-stage computing units 246 and 247, respectively.

The inverse-matrix generating unit 251 computes the inverse matrix $H^{-1}$ and the inverse-matrix multiplying unit 252 multiplies the reception signal points $r_0$ and $r_1$ by the inverse matrix $H^{-1}$, as described above, for, for example, the following reason.

That is, when the transmission vector is represented by $(x_0, x_1)$ and the reception vector is represented by $(r_0, r_1)$, the 2×2 MIMO wireless communication system 10 can be modeled as:

$$\begin{pmatrix} r_0 \\ r_1 \end{pmatrix} = \begin{pmatrix} a_0 & b_0 \\ c_0 & d_0 \end{pmatrix} \begin{pmatrix} x_0 \\ x_1 \end{pmatrix} + \begin{pmatrix} n_0 \\ n_1 \end{pmatrix} \quad (18)$$

The inverse matrix $H^{-1}$ of the channel matrix H is expressed as:

$$H^{-1} = \frac{1}{a_0 d_0 - b_0 c_0} \begin{pmatrix} d_0 & -b_0 \\ -c_0 & a_0 \end{pmatrix} \quad (19)$$

Sequentially multiplying equation (18) from the left by the inverse matrix $H^{-1}$ yields:

$$\frac{1}{a_0 d_0 - b_0 c_0} \begin{pmatrix} d_0 r_0 - b_0 r_1 \\ -c_0 r_1 + a_0 r_0 \end{pmatrix} = \begin{pmatrix} x_0 \\ x_1 \end{pmatrix} + \frac{1}{a_0 d_0 - b_0 c_0} \begin{pmatrix} d_0 n_0 - b_0 n_1 \\ -c_0 n_1 + a_0 n_0 \end{pmatrix} \quad (20)$$

Let the elements be given as:

$$r_0' = \frac{d_0 r_0 - b_0 r_1}{a_0 d_0 - b_0 c_0} \quad (21)$$

$$r_1' = \frac{-c_0 r_1 + a_0 r_0}{a_0 d_0 - b_0 c_0} \quad (22)$$

$$n_0' = \frac{d_0 n_0 - b_0 n_1}{a_0 d_0 - b_0 c_0} \quad (23)$$

$$n_1' = \frac{-c_0 n_1 + a_0 n_0}{a_0 d_0 - b_0 c_0} \quad (24)$$

In this case, equation (20) can be modified as:

$$\begin{pmatrix} r_0' \\ r_1' \end{pmatrix} = \begin{pmatrix} x_0 \\ x_1 \end{pmatrix} + \begin{pmatrix} n_0' \\ n_1' \end{pmatrix} \quad (25)$$

The elements of equation (25) are given by:

$$r_0' = x_0 + n_0' \quad (25\text{-}1)$$

$$r_1' = x_1 + n_1' \quad (25\text{-}2)$$

In this form, the candidate points of the transmission signal points $x_0$ and $x_1$ can be computed independently. The inverse-matrix multiplying unit 252 computes equations (20) to (25) and outputs the resulting $r_0'$ and $r_1'$.

For example, on the basis of equation (25-1), the first-stage computing unit 246 determines, in ascending order of a distance $|r_0' - x_0|^2$, candidate points of the transmission signal point $x_0$ which correspond to the number of candidates determined by the number-of-candidates determining unit 245. The first-stage computing unit 246 also determines distances $l_0$ between the determined candidate points and the signal point $r_0'$.

For example, on the basis of equation (25-2), the second-stage computing unit 247 determines, in ascending order of a distance $|r_1' - x_1|^2$, the candidate points of the transmission signal point $x_1$ which correspond to the number of candidates determined by the number-of-candidates determining unit 245. The second-stage computing unit 247 also determines distances $l_1$ between the determined candidate points and the signal point $r_1'$.

Figure 8:
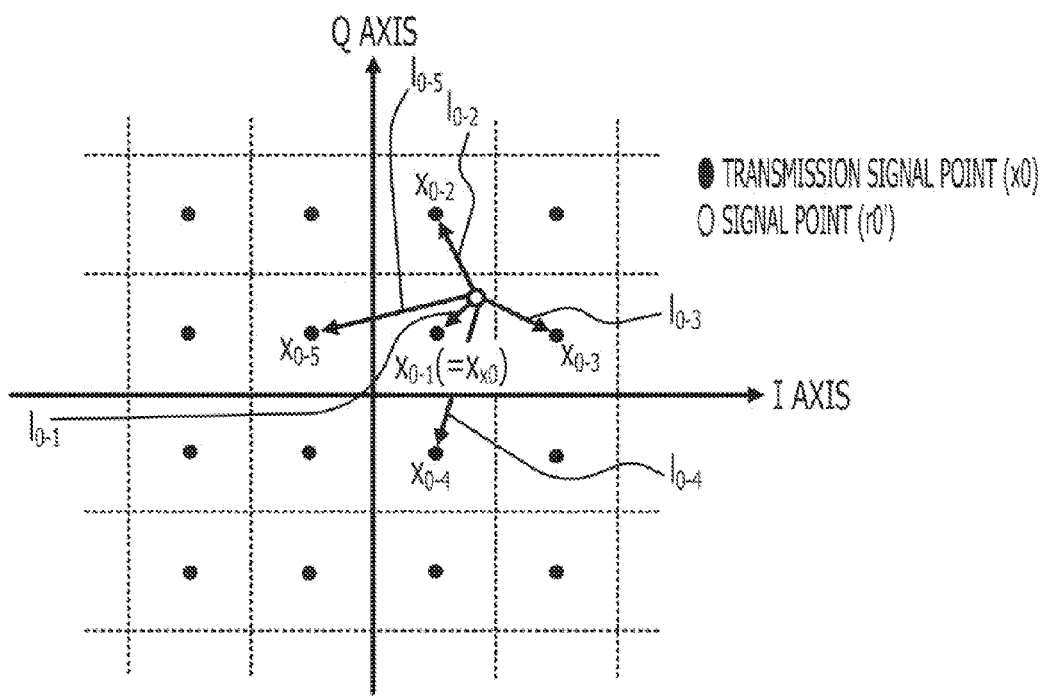
FIG. 8 depicts an example of relationships between transmission signal points and a signal point.

FIG. 8 depicts an example of relationships between a transmission signal point $x_0$ and a signal point $r_0'$. In the example depicted in FIG. 8, the number of candidates is 5, so that five candidate points $x_{0-1}$ to $x_{0-5}$ are selected and five distances $l_{0-1}$ to $l_{0-5}$ are computed. The first-stage computing unit 246 can compute a number of candidate points corresponding to the number of candidates, for example, by using an area determination method. For example, since the transmission signal points are placed at positions in an IQ plane in accordance with a modulation system, the area determination method may be a method in which the positions and boundary lines are preset and the candidate points are determined according to, in an IQ plane, within which boundary line the signal point $r_0'$ is located.

However, as indicated by equation (20), the candidate points of the transmission signal points $x_0$ and $x_1$ which are determined in the corresponding stages are also candidate points in a vector space which are obtained by multiplying the reception signal points $r_0$ and $r_1$ by the inverse matrix $H^{-1}$. Thus, since the distances $l_0$ and $l_1$ are also distances in a vector space which are obtained by multiplication of the inverse matrix $H^{-1}$, multiplying the determined distances $l_0$ and $l_1$ by the channel matrix H enables the distances $l_0$ and $l_1$ to be converted into distances in the same vector space as for the reception signal points $r_0$ and $r_1$ (or into the distances between the candidate points and the reception signal points $r_0$ and $r_1$). Multiplying the distances $l_0$ and $l_1$ by the channel matrix H yields:

$$\begin{pmatrix} a_0 & b_0 \\ c_0 & d_0 \end{pmatrix} \begin{pmatrix} l_0 \\ l_1 \end{pmatrix} = \begin{pmatrix} a_0 l_0 + b_0 l_1 \\ c_0 l_0 + d_0 l_1 \end{pmatrix} \quad (26)$$

A total-distance calculating unit 253 is adapted to calculate a square sum of the elements of equation (26) as a total distance L and to select the candidate points of the transmission signal points $x_0$ and $x_1$ such that the total distance L becomes the smallest. The total distance L can be given as:

$$L = |a_0 l_0 + b_0 l_1|^2 + |c_0 l_0 + d_0 l_1|^2 \qquad (27)$$
$$= (|a_0|^2 + |c_0|^2)|l_0|^2 + (|b_0|^2 + |d_0|^2)|l_1|^2 +$$
$$2\text{Re}\{(a_0^* b_0 + c_0^* d_0) l_0^* l_1\}$$

The candidate points of the transmission signal points $x_0$ and $x_1$ with which the total distance L is the smallest are candidate points with which the distances between the candidate points and the corresponding reception signal points $r_0$ and $r_1$ are the smallest in the same vector space as for the reception signal points $r_0$ and $r_1$. The total-distance calculating unit 253 computes the candidate points with which the total distance L is the smallest. The estimating unit 2460 for estimating two transmission signal points $x_0$ and $x_1$ may have, for example, the first-stage and second-stage computing units 246 and 247 and the total-distance calculating unit 253.

In the second embodiment, although the orthogonality computing unit 244 computes the orthogonality r and the number-of-candidates determining unit 245 determines the number of candidates for the candidate points of the transmission signal points $x_0$ and $x_1$, as in the first embodiment, the orthogonality computing unit 244 computes the orthogonality r by using the expression below:

$$r = \frac{a_0^* b_0 + c_0^* d_0}{|a_0|^2 + |b_0|^2 + |c_0|^2 + |d_0|^2} \qquad (28)$$

A reason why the orthogonality r is computed in such a manner will be described next. When attention is given to equation (27), the values of the first term and the second term become small as the distance $l_0$ and $l_1$ calculated in the first stage and the second stage decrease. However, even when two distances $l_0$ and $l_1$ are smaller than a threshold, the third term can assume a value that varies depending on the coefficient $(a_0^* b_0 + c_0^* d_0)$. For example, when the coefficient $(a_0^* b_0 + c_0^* d_0)$ is $-10$, the third term becomes small and the total distance L becomes small, as $l_0 * l_1$ is a positive value and the absolute value thereof becomes large. In the computation of the total distance L, not only do the first and second first-stage computing units 246 and 247 independently compute the candidate points with which the distance is the smallest, but also the total-distance calculating unit 253 computes the candidate points with which the total distance L becomes the smallest, on the basis of those candidate points.

As described in the first embodiment, the orthogonality indicates, for example, ease of separation of multiple transmission streams and also indicates the degree of influence of two candidate points selected in the first stage and the second stage. The denominator of equation (28) indicates the coefficients of the first and second terms of the total distance L and the numerator of equation (28) indicates the coefficient of the third term of the total distance L. Thus, equation (28) indicates, for example, the degree of influence of the third term on the first and second terms, and indicates the degree of influence of two candidate points in each stage, as in the first embodiment.

That is, the numerator of equation (28) includes channel estimated values $a_0$, $c_0$, $b_0$, and $d_0$, and is computed using the pilot signals for two transmission streams, and is (or corresponds to) the inner product of two reception vectors for the reception signal points $r_0$ and $r_1$. As described above, since the reception signal points $r_0$ and $r_1$ include components of two transmission signal points, a reception vector for the reception signal point $r_0$ and a reception vector for the reception signal point $r_1$ exist. The numerator of equation (28) assumes a value of 0, when two reception vectors are orthogonal to each other, and assumes a larger value than a threshold as two reception vectors approach parallel to each other. The denominator of equation (28) yields an addition value obtained by adding the magnitude ($|a|^2 + |c|^2$) of the reception vector for the reception signal $r_0$ and the magnitude ($|b|^2 + |d|^2$) of the reception vector for the reception signal r1. Thus, equation (28) generally indicates, for example, the ratio of the addition value of the magnitudes of two reception vectors versus the inner product of two reception vectors. The orthogonality r given by equation (28), therefore, has a value associated with the degree of influence or orthogonality with respect to two candidate points, as in the first embodiment.

Although the orthogonality r in the first embodiment has been described as being the ratio (b/c) of the diagonal element versus the off-diagonal element in the upper triangular matrix R, the orthogonality r can also be expressed using the channel estimated values $a_0$, $c_0$, $b_0$, and $d_0$ on the basis of equations (10) and (11), as in equation (28).

By referring to the number-of-candidates determination table 2451, the number-of-candidates determining unit 245 uses the orthogonality r to determine the number of candidates for the candidate points for each of the transmission signal points $x_0$ and $x_1$, the candidate points being to be selected by the first-stage and second-stage computing units 246 and 247. In the second embodiment, since the number-of-candidates determining unit 245 determines two numbers of candidates, the number-of-candidates determination table 2451 has a form corresponding thereto. FIGS. 9A and 9B illustrate examples of the number-of-candidates determination table 2451. As illustrated in FIG. 9A, the number of candidates for the transmission signal point $x_0$ and the number of candidates for the transmission signal point $x_1$ may be stored independently from each other. Alternatively, the number of candidates for the transmission signal point $x_1$ and the number of candidates for the transmission signal point $x_0$ may be stored in different tables 2451 (e.g., the number-of-candidates determination table 2451 illustrated in FIG. 5 and the number-of-candidates determination table 2451 illustrated in FIG. 9B) so as to correspond to the orthogonality r.

An exemplary operation in the second embodiment will be described next. FIG. 10 is a flowchart illustrating an exemplary operation.

The threshold controller 200 starts processing in operation S20 and determines channel estimated values in operation S21. For example, the channel estimating unit 241 determines channel estimated values $a_0$, $c_0$, $b_0$, and $d_0$ on the basis of pilot signals, as in the first embodiment.

In operation S22, the receiving apparatus 200 determines an inverse matrix $H^{-1}$ of a channel matrix H. For example, on the basis of the channel estimated values $a_0$, $c_0$, $b_0$, and $d_0$, the inverse-matrix generating unit 251 uses equation (19) to compute the inverse matrix $H^{-1}$.

Subsequently, in operation S23, the receiving apparatus 200 multiplies reception signal points $r_0$ and $r_1$ by the inverse matrix $H^{-1}$, and outputs the resulting signal points $r_0'$ and $r_1'$ to the first-stage and second-stage computing units 246 and 247, respectively. For example, the inverse-matrix multiplying unit 252 computes equations (20) to (25).

In operation S24, the receiving apparatus 200 computes an orthogonality r on the basis of the channel estimated values $a_0$, $c_0$, $b_0$, and $d_0$. For example, the orthogonality computing unit 244 computes the orthogonality r by computing equation (28).

In operation S25, on the basis of the orthogonality r, the receiving apparatus 200 determines the number of candidates for each of the transmission signal points $x_0$ and $x_1$. For example, when the orthogonality r is smaller than a threshold (or the reception quality is favorable), the number-of-candidates determining unit 245 determines the number of candidate points for each of the transmission signal points $x_0$ and $x_1$ in the first-stage and second-stage computing units 246 and 247 such that the number of candidate points is smaller than a threshold. Thus, for example, the amounts of processing in the first stage and the second stage are reduced by amounts corresponding to a reduction in the number of candidates relative to the thresholds, as in the first embodiment. When the orthogonality r is larger than the threshold (or when the reception quality is not favorable), the number-of-candidates determining unit 245 determines the number of candidates for each of the transmission signal points $x_0$ and $x_1$ such that the number of candidates is larger than the threshold. With this arrangement, for example, it is possible to prevent radio characteristic deterioration caused by a case in which the correct transmission signal points $x_1$ and $x_0$ are not estimated as a result of excessive narrowing down of the number of candidates.

In operation S26, in corresponding stages, the receiving apparatus 200 determines the candidate points of the transmission signal points $x_0$ and $x_1$, the number of candidate points corresponding to the number of candidates, and distances $l_0$ and $l_1$ (i.e., distances between the candidate points and the corresponding signal points $r_0'$ and $r_1'$), the number of distances corresponding to the number of candidates. For example, the first-stage and second-stage computing units 246 and 247 compute the candidate points and the distances, the number of which corresponds to the number of candidates, in ascending order of the distance $|r_0'-x_0|^2$ and the distance $|r_1'-x_1|^2$ on the basis of corresponding equations (25-1) and (25-2).

Subsequently, in operation S27, the receiving apparatus 200 computes total distances L on the basis of the distances $l_0$ and $l_1$ and the channel estimated values $a_0$, $c_0$, $b_0$, and $d_0$. For example, the total-distance calculating unit 253 uses equation (27) to compute a number of total distances L which corresponds to the number of candidates.

Subsequently, in operation S28, the receiving apparatus 200 determines, as transmission signal points $x_0$ and $x_1$, a combination of the candidate points with which the total distance L is the smallest. For example, the total-distance calculating unit 253 determines, as the transmission signal points $x_0$ and $x_1$, the candidate points with which the smallest of the total distances L is obtained, the number of total distances corresponding to the number of candidates.

The receiving apparatus 200 then performs error-correction decoding processing on the transmission signal points $x_0$ and $x_1$ and ends the series of processing in operation S29.

Third Embodiment

The descriptions in the first and second embodiments have been given of the 2×2 MIMO wireless communication system 10 having two transmit antennas 150 and two receive antennas 210. The embodiment is also applicable to, for example, an n×m MIMO wireless communication system 10 (where n and m are natural numbers that do not assume 2 at the same time and that satisfy n≧2 and m≧2). Such an application will be described below as a third embodiment.

If, however, the number "m" of receive antennas is smaller than the number "n" of transmit antennas, the throughput characteristic deteriorates. Thus, the following description is given of a case in which the number "m" of receive antennas is larger than the number "n" of transmit antennas. First, a description will be given of an example of a case in which the number "m" of receive antennas and the number "n" of transmit antennas are the same (i.e., m=n).

Figure 11:
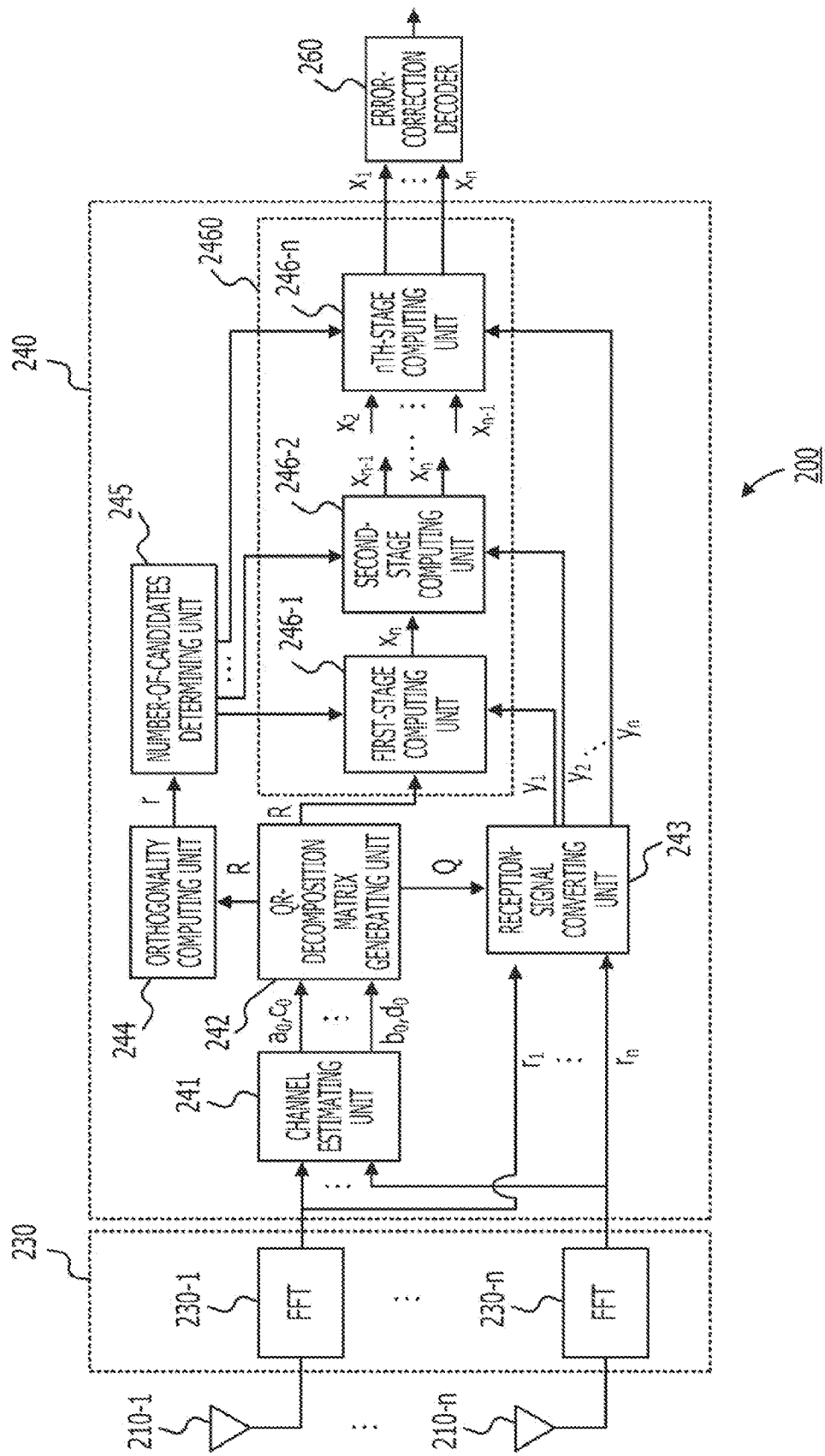
FIG. 11 is a diagram illustrating another exemplary configuration of the receiving apparatus.

FIG. 11 illustrates another exemplary configuration of the receiving apparatus 200. The receiving apparatus 200 includes first to nth receive antennas 210-1 to 210-n, first to nth FFT units 230-1 to 230-n, and first-stage to nth-stage computing units 246-1 to 246-n.

The first to nth receive antennas 210-1 to 210-n output reception signals to the first to nth FFT units 230-1 to 230-n.

The first to nth FFT units 230-1 to 230-n output FFT-processed pilot signals to the channel estimating unit 241 and output FFT-processed reception signals $r_1$ to $r_n$ to the reception-signal converting unit 243.

The channel estimating unit 241 outputs channel estimated values for the respective receive antennas 210-1 to 210-n (or for the respective transmission streams 1 to n) to the QR-decomposition matrix generator 242. On the basis of the channel estimated values, the QR-decomposition matrix generating unit 242 generates a channel matrix H and performs QR decomposition thereon to generate a matrix R. The QR-decomposition matrix generating unit 242 then outputs the matrix R to the orthogonality computing unit 244. For example, when the elements of the matrix R are represented by $R_{i,j}$ (i=1 to n, j=1 to n), the matrix R can be expressed as:

$$R = (R_{i,j}) = \begin{pmatrix} R_{1,1} & R_{1,2} & \ldots & R_{1,n} \\ R_{2,1} & & & \\ \vdots & & \ddots & \\ R_{n,1} & \ldots & & R_{n,n} \end{pmatrix} \quad (29)$$

For example, the orthogonality computing unit 244 computes an orthogonality r by using equation (29):

$$r = \frac{\sqrt{\sum_{j=1}^{n-k} |R_{j,n-k+1}|^2}}{|R_{n-k+1,n-k+1}|} \quad (30)$$

In equation (30), when vectors $A_1$ to $A_{n-k+1}$ are orthogonal (or the reception quality is more favorable than a threshold), r is equal to 0, and when the vectors $A_1$ to $A_{n-k+1}$ are parallel (or the reception quality is less favorable than the threshold), r is infinite, as in the first embodiment.

For example, when the orthogonality r is larger than a first threshold, the number-of-candidates determining unit 245 determines the number of candidates for $x_{n-k+1}$ to be selected in the kth stage such that the number of candidates is larger than a second threshold. When the orthogonality r is smaller than or equal to the first threshold, the number-of-candidates determining unit 245 determines the number of candidates for $x_{n-k+1}$ to be selected in the kth stage such that the number of candidates is smaller than or equal to the second threshold.

The first-stage to nth-stage computing units 246-1 to 246-n select candidate points of the transmission signal points $x_n$ to $x_1$, the candidate points corresponding to the respective determined numbers of candidates. For example, the kth-stage computing unit 246-k selects candidate points of the transmission signal point $x_{n-k+1}$ which corresponds to the determined number of candidates, and outputs the selected candidate points to the (k+1)th-stage computing unit 246-(k+1) in conjunction with the candidate points for the transmission signal points $x_1$ to $x_n$. The nth-stage computing unit 246-n outputs the candidate points of the n transmission signal points $x_1$ to $x_n$. For example, the first-stage to nth-stage computing units 246-1 to 246-n may constitute the estimating unit 2460.

For example, for n=3 (i.e., the number of receive antennas is 3), the upper triangular matrix R resulting from the QR decomposition can be expressed as:

$$R = \begin{pmatrix} a & b & c \\ 0 & d & e \\ 0 & 0 & f \end{pmatrix} \quad (31)$$

The first-stage computing unit 246-1 selects $x_3$ corresponding to the number of candidates such that expression (32) below is smaller than or equal to a threshold.

$$|y_1 - fx_3|^2 \quad (32)$$

The second-stage computing unit 246-2 selects $x_2$ corresponding to the number of candidates such that expression (33) below is smaller than or equal to a threshold.

$$|y_1 - fx_3|^2 + |y_2 - dx_2 - ex_3|^2 \quad (33)$$

The third-stage computing unit 246-3 further selects $x_1$ corresponding to the number of candidates such that expression (34) below is smaller than or equal to a threshold.

$$|y_1 - fx_3|^2 + |y_2 - dx_x - ex_3|^2 + |y_3 - ax_1 - bx_2 - cx_3|^2 \quad (34)$$

In this case, from equation (30), the orthogonality r for k=2 (the second stage) is given by:

$$r = \frac{\sqrt{|R_{1,2}|^2}}{|R_{2,2}|} = \frac{|R_{1,2}|}{|R_{2,2}|} = \frac{|b|}{|d|} \quad (35)$$

Equation (35) indicates a ratio of the coefficient d (e.g., equation (33)) of $x_2$ selected in the second stage versus the coefficient b (e.g., equation (34)) of $x_2$ selected in the third stage. This is also the ratio of the coefficient (e.g., d) of the candidate points selected in the current stage versus the coefficient (e.g., b) of the same candidate points in the next stage, similarly to the orthogonality r (equation (13)) in the first embodiment described above.

For n=3 and k=1 (the first stage), the orthogonality r is given by:

$$r = \frac{\sqrt{|c|^2 + |e|^2}}{|f|} \quad (36)$$

Equation (36) also indicates that the number of candidates for $x_3$ selected in the first stage is dependent on the coefficient f of $x_3$ selected in the first stage, the coefficient e of $x_3$ in the second stage, and the coefficient c of $x_3$ in the third stage.

Thus, in the kth stage, the number-of-candidates determining unit 245 determines the number of candidates for the transmission signal point $x_{n-k+1}$, in accordance with the value of the orthogonality r. In such a manner, the number of candidates may be determined according to the orthogonality r. The reason is that, for example, the magnitude of the influence the candidate point $x_{n-k+1}$ selected in the kth stage has on the distance calculated in the kth stage depends on the element $R_{n-k+1,n-k+1}$ (e.g., f) of the matrix R, whereas the magnitude of the influence the same candidate point $x_{n-k+1}$ has on the distances calculated in the (k+1)th and the subsequent stages depends on the element $R_{j,n-k+1}$ (e.g., c and e, where j is the stage number of the (k+1)th or subsequent stages) of the matrix R.

As another example, the orthogonality r may be given as:

$$r = \frac{|R_{n-k,n-k+1}|}{|R_{n-k+1,n-k+1}|} \quad (37)$$

For example, for n=3 and k=1, the orthogonality r is given as:

$$r = \frac{|e|}{|f|} \quad (38)$$

The orthogonality r indicted by equation (37) takes into account the degree of influence (e.g., the coefficient e in the second stage) of $x_k$ on the distance calculation in the (k+1)th stage, but does not take into account the influence (e.g., the coefficient c in the third stage) on the distance calculation in the (k+2)th and subsequent stages. Since the influence on the stage after the next is not considered in the current stage, the amount of calculation can be reduced compared to the case of equation (30).

In equation (37), when the vectors $A_1$ to $A_{n-k+1}$ are orthogonal (or when the reception quality is more favorable than the threshold), r is equal to 0, and when the vectors are parallel, r is infinite. For example, the orthogonality computing unit 244 computes the orthogonality r by using equation (37), and the number-of-candidates determining unit 245 determines the number of candidates for each stage in accordance with the orthogonality r, in the same manner as described above. In equations (30) and (37), the orthogonality r is also expressed as a ratio of the diagonal element (e.g., the coefficient f) versus the off-diagonal element (e.g., the coefficients c and e) in the matrix R resulting from the QR decomposition.

As another example, the orthogonality r may be expressed as:

$$r = \sqrt{\sum_{i=1}^{n-k} \sum_{j=n-k+1}^{n} |R_{i,j}|^2} \quad (39)$$

Equation (39) indicates, for example, the degree of influence the candidate points of x which were selected in the first to kth stages has on the (k+1)th and subsequent stages. When equation (39) is used, the candidate points with which the cumulative distance is smaller than or equal to Cxr (C is a constant) are selected, as the ultimate candidate points, from the candidate points with which the cumulative distances are smallest up to the third stages. Further, in the (k+1)th stage, the ultimate candidate points are used for the distance computation. The cumulative distance is, for example, the sum of distances calculated up to the kth stage (or the distance calculated in the kth stage).

For example, for n=3 and k=2, the orthogonality r is given as:

$$r=\sqrt{|b|^2+|c|^2} \qquad (40)$$

For example, when r in equation (40) is 3 and C is 10, C×r=30 is given. In this case, the cumulative distance is, for example, the sum of a distance ($|y_3-fx_3|^2$) calculated in the first stage and a distance ($|y_2-dx_2|ex_3|^2$) calculated in the second stage. For example, it is assumed that the cumulative distance is 10 when (1, 3) are selected as a set ($x_3$, $x_2$) of candidate points, the cumulative distance is 15 when the candidate points (−1, 1) are selected, and the cumulative distance is 50 when the candidate points (−1, −1) are selected. In this case, with respect to sets of candidate points to be selected in the third stage, the difference of the cumulative distance "15" relative to the smallest cumulative distance "10" is 5 and the difference of the cumulative distance "50" relative to the smallest cumulative distance "10" is 40. Thus, the two sets (1, 3) and (−1, 1) with which the difference in the cumulative distance is smaller than or equal to C×r (=30) are to be selected in the third stage.

When equation (39) is used, for example, sets of candidate points to be calculated in a next stage are determined based on the orthogonality r and the cumulative distance. Thus, in FIG. 11, the (k−1)-stage computing unit 246-(k−1) outputs the cumulative distance for the selected candidate points to the number-of-candidates determining unit 245. The number-of-candidates determining unit 245 compares C×r, obtained by multiplying the constant C by the orthogonality r, with the cumulative distance, and determines sets of candidate points to be selected, in accordance with the magnitude indicated by the comparison, as described above. The number-of-candidates determining unit 245 then reports the determined sets to the kth-stage computing unit 246-k. The kth-stage computing unit 246-k computes distances in the kth stage to select candidate points of the transmission signal point $x_{n-k+1}$ from the sets of candidate points determined by the number-of-candidates determining unit 245 and outputs a cumulative distance including the candidate points to the number-of-candidates determining unit 245. Thereafter, processing in the (k+1)th and subsequent stages are executed.

The possibility that the above-described inversion occurs in the (k+1)th and subsequent stages becomes higher than a threshold, as the orthogonality r increases and the difference in the cumulative distance up to the kth stage decreases.

In equation (39), when the reception vectors are orthogonal to each other (or, when the reception quality is more favorable than the threshold), r is equal to 0, and when the reception vectors are parallel to each other (or, when the reception quality is less favorable than the threshold), r is infinite.

The above description has been given of a case in which the number "n" of transmit antennas and the number "m" of receive antennas are the same. Calculation can similarly be performed when the number "m" of receive antennas is larger than the number "n" of transmit antennas. For example, when the number of transmit antennas is 3 and the number of receive antennas is 2, let the upper triangular matrix R be given as:

$$R = \begin{pmatrix} a & b \\ c & d \\ 0 & e \end{pmatrix} \qquad (41)$$

In this case, when the converted signal points are indicated as $y_i$ to $y_3$ with respect to the reception signal points $r_1$ to $r_3$ and the transmission signal points are indicated as x1 and x2, the converted signal points can be expressed as:

$$\begin{pmatrix} y_1 \\ y_2 \\ y_3 \end{pmatrix} = \begin{pmatrix} a & b \\ c & d \\ 0 & e \end{pmatrix} \begin{pmatrix} x_1 \\ x_2 \end{pmatrix} + \begin{pmatrix} n_1 \\ n_2 \\ n_3 \end{pmatrix} \qquad (42)$$

In this case, $n_1$ to $n_3$ denote noise components.

In this case, as computation in the first stage, the first-stage computing unit 246-1 selects $x_2$ corresponding to the number of candidates such that expression (43) below is smaller than a threshold.

$$|y_3-ex_2|^2 \qquad (43)$$

As computation in the second stage, the second-stage computing unit 246-2 selects $x_2$ and $x_1$ corresponding to the number of candidates such that expression (44) below is smaller than a threshold.

$$|y_3-ex_2|^2+|y_2-cx_1-dx_2|^2 \qquad (44)$$

In addition, as computation in the third stage, the third-stage computing unit 246-3 selects $x_1$ and $x_2$ such that expression (45) below is the smallest.

$$|y_3-ex_2|^2+|y_2-cx_1-dx_2|^2+|y_1-ax_1-bx_2|^2 \qquad (45)$$

In each stage, by using equations (30) or (37), the number-of-candidates determining unit 245 can determine the number of candidates in the same manner as described above.

However, the third-stage computing unit 246-3 cannot newly select $x_1$ and $x_2$ and thus computes the distances on the basis of the candidates of $x_1$ and $x_2$ selected by the second-stage computing unit 246-2. Thus, for m>n, no new candidate points of the transmission signal point x are selected in the halfway and subsequent stages and thus the distances with respect to $x_i$ selected in the stages prior to the halfway stage are calculated.

Other Embodiments

Other embodiments will be described next.

For example, for an OFDM system, it is possible to perform MIMO decoding on one or multiple subcarriers at the same time. Thus, the number-of-candidates determining unit 245 can also determine the number of candidates for each subcarrier. For example, as illustrated in FIG. 3, the first and second FFT units 231 and 232 output transmission signal points $r_0$ and $r_1$ for each subcarrier and the reception-signal converting unit 243 outputs the converted signal points $y_1$ and $y_0$ for each subcarrier. Since the channel estimating unit 241 computes the channel estimated values $a_0$, $c_0$, $b_0$, and $d_0$ for each subcarrier, the orthogonality computing unit 244 can compute the orthogonality r for each subcarrier. In this case, the total number of candidates can be made constant according to the number of subcarriers decoded by the error-correction decoder 260. For example, when the number of subcarriers is 5, the total number of candidates assigned to the first to fifth subcarriers may be set to 100, for example, with the number of candidates for the candidate points of the transmission signal point $x_1$ with respect to the first subcarrier being set to 10, the number of candidates with respect to the second subcarrier being set to 17, and so on. Such an arrangement can make the number of processible candidates in the entire receiving apparatus 200 to be constant, can facilitate circuit design, and can also make the circuit scale smaller than a certain size. In the second embodiment, similarly, the inverse-matrix multiplying unit 252 can output the signal points $r_0'$ and $r_1'$ for each subcarrier and the number-of-candidates determining unit 245 can determine the number of candidates for the transmission signal points $x_1$ and $x_0$ for each subcarrier, as illustrated in FIG. 7.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A receiving apparatus for estimating first and second transmission signals transmitted from respective first and second transmit antennas of a transmitting apparatus, based on first and second reception signals received by respective first and second receive antennas, the receiving apparatus comprising:
a converting unit that multiplies first and second reception signal points for the respective first and second reception signals by a matrix and outputs resulting converted first and second reception signal points;
a number-of-candidates determining unit that determines a number of candidates for at least first transmission-signal candidate points, based on a reception quality for the first and second reception signals; and
an estimating unit that selects, based on the converted first and second reception signal points, the first transmission-signal candidate points and second transmission-signal candidate points, the number of first transmission-signal candidate points corresponding to the determined number of candidates, and that estimates, as the first and second transmission signals, the first and second transmission-signal candidate points with which distances between the selected first and second transmission-signal candidate points and the corresponding converted first and second reception signal points are smallest.

2. The receiving apparatus according to claim 1, wherein the reception quality is a measure of orthogonality indicating ease of separation of the first transmission signal and the second transmission signal received by the first or second receive antenna.

3. The receiving apparatus according to claim 1, wherein the reception quality is a ratio of a diagonal element versus an off-diagonal element in an upper triangular matrix R resulting from QR decomposition of a channel matrix generated based on known signals contained in the first and second reception signals.

4. The receiving apparatus according to claim 1, wherein the reception quality is a ratio of an addition value obtained by adding magnitudes of first and second reception vectors for the first and second reception signal points versus an inner product of the first and second reception vectors.

5. The receiving apparatus according to claim 1, wherein the number-of-candidates determining unit determines, for each subcarrier, the number of candidates for at least the first transmission-signal candidate points, based on the reception quality, and the number of first transmission-signal candidate points for a number of subcarriers has a constant value.

6. The receiving apparatus according to claim 3, further comprising:
a QR decomposition matrix generating unit that generates a channel matrix based on the known signals and that performs QR decomposition on the channel matrix to generate the upper triangular matrix R and a unitary matrix Q,
wherein the matrix is the unitary matrix Q; and
the estimating unit comprises
a first-stage executing unit that selects, in ascending order of the distances between the converted first reception signal and the first transmission-signal candidate points, the first transmission-signal candidate points, the number of which corresponds to the number of candidates, and
a second-stage executing unit that selects, with respect to the first transmission-signal candidate points selected by the first-stage executing unit, the first and second transmission-signal candidate points with which the distance between the second transmission-signal candidate point and the converted second reception signal point is smallest and that estimates the selected first and second transmission-signal candidate points as the first and second transmission signal points.

7. The receiving apparatus according to claim 4, further comprising:
an inverse-matrix generating unit that generates a channel matrix based on known signals contained in the first and second reception signals and that generates an inverse matrix of the channel matrix;
wherein the number-of-candidates determining unit determines the number of candidates for the first transmission-signal candidate points and the number of candidates for the second transmission-signal candidate points based on the reception quality:
the matrix is the inverse matrix; and
the estimating unit comprises
a first computing unit that selects, based on the converted first reception signal point, the first transmission-signal candidate points, the number of which corresponds to the number of candidates, and that computes the distances between the selected first transmission-signal candidate points and the converted first reception signal point,
a second computing unit that, based on the converted second reception signal point, selects the second transmission-signal candidate points, the number of which corresponds to the number of the candidates, and that computes the distances between the selected second transmission-signal candidate points and the converted second reception signal point, and
a determining unit that computes total distances based on the distances output from the first and second computing units and elements of the channel matrix and that estimates, as the first and second transmission signals, the first and second transmission-signal candidate points with which the total distance satisfies a condition.

8. The receiving apparatus according to claim 7, wherein the determining unit computes the total distances by using:

$$(|a_0|^2+|c_0|^2)|l_0|^2+(|b_0|^2+|d_0|^2)|l_1|^2+2Re\{(a_0{}^*b_0+c_0{}^*d_0)l_0{}^*l_1\}$$

where $l_0$ and $l_1$ indicate the distances output from the respective first and second computing units, $a_0$ and $b_0$ indicate the channel estimated values for the first reception signal, and $c_0$ and $d_0$ indicate the channel estimated values for the second reception signal, and the determining unit estimates, as the first and second transmission signal points, the first and second transmission-signal candidate points with which a smallest of the total distances is obtained, the number of total distances corresponding to the number of candidates.

9. The receiving apparatus according to claim 1, wherein, when the reception quality has a value that is more favorable than a first threshold, the number-of-candidates determining unit determines the number of candidates which is smaller than a second threshold, and when the reception quality has a value that is less favorable than the first threshold, the number-of-candidates determining unit determines the number of candidates which is larger than or equal to the second threshold.

10. The receiving apparatus according to claim 1, wherein the number-of-candidates determining unit determines the number of candidates for the first transmission-signal candidate points based on a sum of the distances between the first and second transmission-signal candidate points and the corresponding converted first and second reception signal points.

11. The receiving apparatus according to claim 7, wherein the estimating unit selects, in ascending order of the distances between the first and second transmission-signal candidate points and the corresponding converted first and second reception signal points, the first and second transmission-signal candidate points, the number of which corresponds to the number of candidates.

12. The receiving apparatus according to claim 7, wherein, when the converted first and second reception signal points are located in, in an IQ plane, respective areas in which the first and second transmission-signal candidate points are placed, the first and second computing units select the first and second transmission-signal candidate points as the first and second transmission-signal candidate points with which the distance is smallest.

13. The receiving apparatus according to claim 1, further comprising an error-correction decoding processing unit that performs error-correction decoding on the estimated first and second transmission signals.

14. The receiving apparatus according to claim 1, wherein, when the transmitting apparatus is a base-station apparatus, the receiving apparatus is a terminal apparatus, and when the transmitting apparatus is a terminal apparatus, the receiving apparatus is a base-station apparatus.

15. A receiving apparatus for estimating first and second transmission signals transmitted from respective first and second transmit antennas of a transmitting apparatus, based on first and second reception signals received by respective first and second receive antennas, the receiving apparatus comprising:
a receiver that receives the first and second reception signals through the receive antennas;
a processor that multiplies first and second reception signal points for the respective first and second reception signals by a matrix and outputs resulting converted first and second reception signal points, determines a number of candidates for at least first transmission-signal candidate points, based on a reception quality for the first and second reception signals, and selects, based on the converted first and second reception signal points, the first transmission-signal candidate points and second transmission-signal candidate points, the number of first transmission-signal candidate points corresponding to the determined number of candidates, and that estimates, as the first and second transmission signals, the first and second transmission-signal candidate points with which distances between the selected first and second transmission-signal candidate points and the corresponding converted first and second reception signal points are smallest.

16. A receiving method for a receiving apparatus for estimating first and second transmission signals transmitted from respective first and second transmit antennas of a transmitting apparatus, based on first and second reception signals received by respective first and second receive antennas, the receiving method comprising:
multiplying first and second reception signal points for the respective first and second reception signals by a matrix and outputting resulting converted first and second reception signal points;
determining a number of candidates for at least first transmission-signal candidate points, based on a reception quality for the first and second reception signals;
selecting, based on the converted first and second reception signal points, the first transmission-signal candidate points and second transmission-signal candidate points, the number of first transmission-signal candidate points corresponding to the determined number of candidates; and
estimating, as the first and second transmission signals, the first and second transmission-signal candidate points with which distances between the selected first and second transmission-signal candidate points and the corresponding converted first and second reception signal points are smallest.

* * * * *